United States Patent
Hiller et al.

(10) Patent No.: US 6,590,606 B1
(45) Date of Patent: Jul. 8, 2003

(54) METHOD FOR THE COMPENSATING OF GEOMETRIC IMAGES AND AN ARRANGEMENT FOR CARRYING OUT THE METHOD

(75) Inventors: Klaus Hiller, Gera (DE); Wolfgang Vogel, Jena (DE); Christhard Deter, Gera (DE)

(73) Assignee: LDT GmbH & Co. Laser-Display-Technology KG, Gera (DE)

( * ) Notice: Subject to any disclaimer, the term of this patent is extended or adjusted under 35 U.S.C. 154(b) by 0 days.

(21) Appl. No.: 09/284,295
(22) PCT Filed: Aug. 25, 1998
(86) PCT No.: PCT/EP98/05403
§ 371 (c)(1),
(2), (4) Date: Apr. 12, 1999
(87) PCT Pub. No.: WO99/11062
PCT Pub. Date: Mar. 4, 1999

(30) Foreign Application Priority Data

Aug. 27, 1997 (DE) .......................... 197 37 374

(51) Int. Cl.7 .............................. H04N 3/08; H04N 5/74
(52) U.S. Cl. ...................................... 348/203; 348/745
(58) Field of Search .................................. 348/195, 203, 348/196, 205, 197, 744, 745, 746, 747; H04N 5/74, 9/31, 3/08, 3/02

(56) References Cited

U.S. PATENT DOCUMENTS 5,748,264 A * 5/1998 Hegg .......................... 348/746
5,822,022 A * 10/1998 Deter et al. ................. 348/203

FOREIGN PATENT DOCUMENTS

| DE | 43 24 848 C1 | 3/1995 | |
|---|---|---|---|
| DE | 195 44 067 A1 | 5/1996 | |
| EP | 689 353 A2 | 12/1995 | |
| EP | 756 425 A2 | 1/1997 | |
| EP | 773 678 A2 | 5/1997 | |
| JP | 2-76485 | * 3/1990 | ............ H04N/5/74 |
| JP | 04-323979 A | 11/1992 | |
| JP | 5-37880 | * 2/1993 | |
| JP | 5-153532 | 6/1993 | |
| JP | 8-9309 | 1/1996 | |
| JP | 9-191441 | 7/1997 | |

OTHER PUBLICATIONS

*English Abstract of DE 195 44 067 A1.
*English Abstract of DE 43 24 848 C1.
*English Abstract of JP 04–323979 A.
*English Abstract of JP 9–191441.
*English Abstract of JP 8–9309.
*English Abstract of JP 5–153532.

* cited by examiner

Primary Examiner—David E. Harvey
(74) Attorney, Agent, or Firm—Reed Smith LLP

(57) ABSTRACT

An arrangement for displaying video images on a projection surface, in which the display is carried out on the projection surface at an inclination, comprises a source for the emission of a substantially parallel light bundle for a sequential illumination of image points of the video image, which source can be intensity-modulated, a deflection device for scanning the light bundle in two dimensions, and a control device which controls the intensity modulation for the light bundle as well as the deflection of the light bundle in accordance with a function that is obtained through a calculated distortion correction of the image, at least with respect to the inclination. A method for the compensation of geometric image errors in video images is also disclosed.

20 Claims, 19 Drawing Sheets

METHOD FOR THE COMPENSATING OF GEOMETRIC IMAGES AND AN ARRANGEMENT FOR CARRYING OUT THE METHOD

BACKGROUND OF THE INVENTION

Field of the Invention

The invention is directed to a method for the compensation of geometric image errors in video images with a plurality of lines, each line having a plurality of image points, wherein the image errors to be compensated influence the length of the lines and the ith line in geometric image errors that have not been compensated begins at a location $x_{ai}$ and ends at a location $x_{ei}$ on a projection surface. The invention is further directed to an arrangement for displaying video images on a projection surface in which image points in a plurality of lines are sequentially illuminated and geometric image errors are compensated in accordance with the method, wherein these image errors to be compensated influence the length of the lines and the ith line in geometric image errors that have not been compensated begins at a location $x_{ai}$ and ends at a location $x_{ei}$ on a projection surface. Moreover, the invention is directed to an arrangement for displaying video images on a projection surface in which the display is carried out on this projection surface at an inclination.

DESCRIPTION OF THE RELATED ART

Geometric image errors of the type mentioned above can occur, for example, when a transparency is projected at an angle. For an overhead projector, a mirror is provided for compensation according to WO 97/03380, wherein the image is projected onto the back of a projection surface by means of the mirror. The inclination of the mirror relative to the projection surface is arranged in such a way for compensating trapezoid distortions that the light paths from the projector to the projection surface are approximately identical in all areas of the image.

In a video projection according to DE 32 43 879 C2, mirrors are also used, as in the above-mentioned projection with the overhead projector, to compensate for the trapezoid distortions occurring through diagonal projection.

The above-mentioned compensation with mirrors requires very large mirrors for large-image projection. Therefore, it would take up much space and is substantially limited to rear projection so that the mirrors do not conceal the projection surface from view.

In the video technique disclosed in EP 0 756 425 A2, a liquid crystal matrix controlled with a video image is projected onto a screen. In this case, trapezoid distortions are compensated without mirrors in that all lines of the image are shortened with reference to the length of the shortest line. For this purpose, the picture is distorted on the liquid crystal matrix in a trapezoidal shape in such a way as to compensate precisely for this distortion due to diagonal projection. This type of distortion of the projected image is carried out in the case of LCD images in that image points are omitted in the shortened lines. At very large angles, however, it is to be expected that the loss of resolution will be so great that it will no longer be possible to display a high-quality pictures.

In diagonal projection of video images, trapezoid distortions of the type mentioned above change the line length, for example, when the orientation of the frame scanning is carried out at a small angle. This also changes the related density of image points in the line, so that these errors can essentially only be compensated through correction of the line information.

OBJECT AND SUMMARY OF THE INVENTION

It is the object of the invention to provide a method for compensation of image errors of the type mentioned above and an arrangement for carrying out this method in which, in the case of large angles, loss of information due to missing image points is reduced.

This object is met through a method of the type mentioned above in which a substantially parallel light bundle is deflected on the projection surface in two dimensions for sequential illumination of the image points of the video image, a light bundle for the image point at every location on which the light bundle is deflected is intensity-modulated at this location in accordance with the image point information of the undistorted video image, a value determining the start of the line of the compensated image is defined by $x_{ad} \geq \text{Max}(x_{ai})$ and a value determining the end of the line of the compensated image is defined by $x_{ed} \leq \text{Min}(x_{ei})$, where $x_{ed} > x_{ad}$, and the light bundle for each line is deflected in such a way that all image points of the line i are displayed sequentially within the area $[x_{ad}; x_{ed}]$ on the projection surface. An arrangement according to the invention for carrying out the method comprises a source for the emission of a substantially parallel light bundle for a sequential illumination of image points of the video image, which source can be intensity-modulated, a deflection device for scanning the light bundle in two dimensions, a storage for the sequential storage of line information for the intensity modulation of the source for N image points, two values $x_{ad}$ and $x_{ed}$, where $x_{ed} > x_{ad}$, wherein $x_{ad}$ describes the start of the line of the compensated image, where $x_{ad} \geq \text{Max}(x_{ai})$ of all lines i, and $x_{ed}$ describes the end of the line of the compensated image, where $x_{ad} \geq \text{Min}(x_{ei})$, and a control device for modulating the source and for controlling the deflection device in accordance with functions by which the light bundle is deflected and/or intensity-modulated in such a way that all image points of the line i for deflection can be displayed on the projection surface sequentially within the area $[x_{ad}; x_{ed}]$. Further, in accordance with the invention, there are provided in a special arrangement for the compensation of errors in diagonal projection a source for the emission of a substantially parallel light bundle for a sequential illumination of image points of the video image, which source can be intensity-modulated, a deflection device for scanning the light bundle in two dimensions, and a control device which controls the intensity modulation for the light bundle as well as the deflection of the light bundle in accordance with a function that is obtained through a calculated distortion correction of the image, at least with respect to the inclination.

Therefore, the technique employed in accordance with the invention is totally different from that used in EP 0 756 425 A2. That is, instead of a LCD matrix, substantially parallel light bundles which can be generated, for example, by a laser are used for sequential scanning of an image. Accordingly, there is no dependence on the matrix of an image. This technique has the advantage that the image is always sharp regardless of distance and even without special optics. The sharpness is limited practically only by the diameter of the light bundle. Therefore, by suitable control, an image can be distorted, also without loss of resolution, in such a way that a distortion expressing itself by a change in line length, for example, is compensated.

In particular, in the arrangement for displaying an image by diagonal projection, the image contents are calculated anew and the line density as well as the image point density in the recalculated image are displayed in a distorted manner such that the distortion causes, through the projection, a distortion correction of the video image. In this way, video images can be displayed practically as precisely as desired. Naturally, the accuracy of the calculation and display is substantially higher for CAD applications than for a television picture because the resolving capacity of the human eye is not as high. However, the principle is the same. Subsequent embodiment examples will provide more detailed information on the calculation of the distorted images which are then displayed in a rectified or distortion-corrected manner.

This calculation need not necessarily be carried out anew for every video image. For example, it is sufficient that the video images which are distorted for the purpose of distortion correction are stored on a videotape and then simply read out from the videotape in subsequent displaying of the video image. Further, the calculations are also not limited only to diagonal projection. Other optical influences such as the deflection behavior of the deflection device can also be taken into account in the recalculation. The subsequent embodiment examples will also provide further details on this matter.

In a preferable further development of the invention, it is provided in the method that line information determined for the intensity modulation of the light bundle is stored sequentially in a storage as N image points and the light bundle is blanked at the start of each line i during a time interval for scanning the length $(x_{ad}-x_{ai})$, whereupon the information determined for intensity modulation for the N image points is read out of the storage within a time interval for scanning length $(x_{ed}-x_{ad})$ and the light bundle is intensity-modulated within this time interval with respect to this read-out information, and at the conclusion of the sequential illumination of the N image points on the projection surface the light bundle is blanked for the remainder of the time interval T for the scanning of each line. In a preferable further development of the invention, a fixed time interval T is predetermined for all lines and the control device is intensity-modulated according to a function by means of which the light bundle is blanked at the beginning of each start of a line i during a time interval for scanning the length $(x_{ad}-x_{ai})$, whereupon the information for the N image points which is determined for intensity modulation is read out of the storage within a time interval for scanning the length $(x_{ed}-x_{ad})$, and the source is intensity-modulated with this information, and at the conclusion of the sequential illumination of the N image points on the projection surface the light bundle is blanked for the remainder of the time interval T for scanning each line.

Accordingly, a time control is provided for controlling compensation instead of a control with different line deflection functions for scanning different lines, which would also be possible. For this purpose, an inner area in which the image is displayed is selected for the compensation process from the locations on the projection surface that are accessible through line deflection and frame deflection, that is, by means of the extrema $x_{ai}$ and $x_{ei}$ given by the line scanning of line i. This type of selection leads to the determination of two values $x_{ad}$ and $x_{ed}$ which describe the starting location and the ending location of the lines of the displayed image on the projection surface. The position of these values will be illustrated more clearly hereinafter with reference to the Figures.

The time control provided works in such a way that every line of the video image is scanned within the same time interval T, wherein the areas occurring outside of the area designated by $x_{ad}$ and $x_{ed}$ as a result of the trapezoid error are blanked, while subsequently, for the N image points in the region in which the light bundle is located on the projection surface in the interval between $x_{ed}$ and $x_{ad}$, the stored line information in its entirety is written onto the projection surface in a geometrically correct manner. If the projection angles are not too large, that is, when only slight distortions are to be compensated, the image points can be displayed in a time interval $(x_{ed}-x_{ad})*T/[N*(x_{ei}-x_{ai})]$ that is identical for all image points. However, in the case of high nonlinear distortion of line information, it is recommended that the time intervals for displaying the successive individual image points are suitably selected in accordance with the distortion to be compensated. The required compensation can then be calculated for different arrangements in a manner familiar to those skilled in the art of optics by means of geometrical optics in that the projection surface is occupied by image points and the light paths for light bundles which illuminate these image points are traced back to the deflection device where the relationship between the deflection angle and the scanning time for imaging every image point is compulsorily given.

In another preferable further development of the invention, the intensity of the light bundle for every image point is controlled in inverse proportion to its illumination time. According to this further development, the intensities are corrected in continuously operating sources corresponding to different scanning times and, therefore, corresponding to different illumination times. For this purpose, an attenuator can be provided for the arrangement, in particular. Attenuation is to be achieved rather than amplification because it can be ensured in this way that the output limits of the lasers, mentioned by way of example, for generating the light bundles are not exceeded.

This controlling with reference to the correct image point intensity can be carried out at different points in the control. According to a preferred further development, the proportional controlling is carried out after the readout of information from the storage. In this way, information length in the storage can be economized on because, otherwise, the necessary increased dynamic of the information due to the scaling with respect to the illumination time would increase the required word length of the storage brought about by the image resolution.

Surprisingly, it has been shown that, according to the invention, a distortion can be carried out in the direction of the frame deflection, that is, vertical to the lines. For this purpose, scanning over a constant change in deflection angle which is common in television technology can be dispensed with and the controlling may be selected according to a function in which the line spacing in the projected image is again uniform. In this regard, an advantageous further development of the invention provides that the light bundle is scanned framewise with a function on the basis of which the line spacings of adjacent lines in the total image differ from one another by a maximum of 30% and, in particular, by less than 10%. In a corresponding arrangement, the deflection device for framewise deflection is controlled diverging from a constant change in the deflection angle with a function on the basis of which the line spacings of adjacent lines in the total image differ from one another by a maximum of 30% and especially by less than 10%. The indicated limits of 10% and 30% are sufficient to prevent possibly remaining line spacings from being perceived at a suitable distance. On the other hand, the indicated tolerances also allow an image deflection by means of frame mirrors which, because of the mechanical movement and the resulting inertia, can not exactly follow the predetermined function for compensation of line spacing unconditionally for all lines of the deflection.

The function for controlling is determined geometrically, for example, in such a way that the area of the projection surface available for the video image is uniformly occupied by image points, and the light bundles made possible by the arrangement for the illumination of image points are traced back to the deflection device in order to determine the relationship between the deflection angle and line. In extreme cases, when projecting on a curved projection surface or when the image is even rotated during projection, the deflection can also depend on the position of the respective image point of the line, so that at least a linear component of the line deflection can be mixed into the frame deflection, and/or vice versa, and the image information is then also no longer read out of the image storage in two dimensions, but rather its addresses for the readout of information can also be suitably formed from the input addresses in this case. Other methods for this purpose are described more fully hereinafter with reference to the embodiment examples.

Similarly, the limits for the image point spacings within a line that are still within tolerances can also be specified. In the case of a continuously writing light bundle, however, there are no image points within the actual meaning of the term; for this reason, these limits for the distorted deflection are to be compared by way of the displayed video information $V_i(x)$ with the video information $V_{iT}(x)$ which would result if a completely undistorted image were displayed. Accordingly, it is provided in a further development that the light bundle is scanned linewise by a function in which the video information $V_i(x)$ of the line i for the image information at every location x differs with respect to video information $V_{iT}(x)$ of an undistorted image by a maximum amount $$|V_{iT}(x) - V_i(x)| = \left|\frac{\partial V_i}{\partial x} \Delta x_i\right|,$$

where the value $\Delta x_i$ determined by this equation is less than 0.3-times the line length, especially less than 0.1-times the line length, divided by the number of image points of the video image according to the video standard. In this respect, it is provided for an arrangement that the deflection device with respect to line deflection is controlled in divergence from a constant change in deflection angle at which the video information $V_i(x)$ of the line i for the image information at every location x differs with respect to video information $V_{iT}(x)$ of an undistorted image by a maximum amount $$|V_{iT}(x) - V_i(x)| = \left|\frac{\partial V_i}{\partial x} \Delta x_i\right|,$$

where the value $\Delta x_i$ determined by this equation is less than 0.3-times the line length, especially less than 0.1-times the line length, divided by the number of image points according to the video standard.

As has already been made clear, the image point density can depend heavily upon the line and the position of the respective image point in the line. In the same way, the light spot of the substantially parallel light bundle on the projection surface is also larger or smaller depending on the image point to be illuminated. For this reason, the diameter of the light bundle is generally selected such that, even in the least favorable image point locations with respect to the achievable resolution, suitably large image points can always be displayed. However, for other image areas within the image this means that the resolution could be increased. Interpolation algorithms of a known type can be used for this increase in resolution in order to generate the additional image points. Information is gained in this way without increasing the number of lines in general because the image point density in video images is always limited by the transmission bandwidth for the image. Therefore, it is generally sufficient for generating additional image points to provide a larger quantity N of storage locations for the interpolation of the information of a line and to carry out the scanning of the analog video signal for storage at a higher frequency than that prescribed based on the image point frequency for displaying lines in the video standard. Therefore, according to a preferable further development of the invention, it is provided that the number N is greater than the quantity of image points of the video standard of the video image to be displayed.

The analog video signal is accordingly already scanned before storage with a correspondingly higher resolution and is then available for displaying in smaller time intervals also with increased resolution.

The increase in the quantity N has still further advantages in another further development of the invention. This further development of the invention is characterized in that the control device also stores in the storage the information for dark image points which is required before and after the time interval for scanning the length $(x_{ed}-x_{ad})$, and the line information in the storage generated in this way can be supplied in its entirety to the deflection device during time T. The deflection device can always be operated in the same manner for the readout of the storage. The preparation of the data for the image points that are blanked according to the invention by storing corresponding information in the storage generates in a storage line the entire line to be scanned. This has substantial advantages with respect to the circuitry required for the correction of geometric image errors, as will also be made clearer hereinafter with the aid of embodiment examples. In particular, it is also possible in a simpler manner in this further development to carry out image transformation with respect to the geometric image errors in two directions in real time, which would only be possible with especially fast electronics with distortions in two directions because of high video frequencies.

As has already been mentioned, it is extremely advantageous according to an advantageous further development of the invention that before displaying the video image the image is calculated anew with respect to the deflections and spatial correlation of the image points for displaying an undistorted image.

The possibility for compensation, according to the invention, of geometric image errors of the type mentioned above provides an unexpected advantage. As a result of the compensation method, a laser video device can be arranged, as in the prior art, at a greater angle to the projection surface when projecting a video image on a wall of a room, for example, on the ceiling.

The image distortion caused by projecting at an angle can likewise be compensated with the method. Given a suitable arrangement of the projection surface and laser video system, it is even possible to select a projection geometry that rules out the possibility of a person entering the area of laser light, so that applicable legal requirements for laser safety can be met more easily or even without additional expenditure. In this regard, especially, a preferred further development of the arrangement according to the invention provides the following: A first component group which comprises the deflection device and at least one socket for inserting a light-conducting fiber and within which the light introduced into the socket is guided for deflection into the deflection device, a component group which is separate from the first component group and which has the control device and the source which can be intensity-modulated and at least one socket for insertion of a light-conducting fiber and within which the light of the intensity-modulated source is conducted into this socket, at least one light-conducting fiber for coupling the first component group with the second component group via the respective sockets and a fastening device for the first component group by which the first component group can be arranged at an angle to the projection surface, wherein the compensation is configured for correcting the distortion given by imaging at this angle.

Due to the fact that the deflection device is separated from the component group containing the lasers and their modulation control, it is necessary to fasten only a small, light projection head as first component group to the ceiling of the room, as mentioned by way of example, which can easily be accomplished by the average user with little mechanical know-how. In this respect, it is noted that this should be just as simple as hanging a lamp, which the average consumer can carry out independently without employing an electrician. The essential electronic devices, both the laser and modulators, are arranged in a second component group which can also contain the operating controls. The second component group can be arranged, for example, on the floor or on a shelf.

The transmission of image information between the two component groups is carried out by light-conducting fibers. For this purpose, a socket is provided in the separate component groups for insertion of the light-conducting fibers. This socket likewise facilitates the installation of a video system which is divided into two component groups in the manner mentioned above. Further, the second component group formed of lasers, modulators and other control devices can also be disconnected easily because of this construction when sent out for maintenance and repair.

As was already stated above, it is particularly advantageous when fastening means are provided for the first component group for fastening the projection head at the ceiling, the wall or floor of a room, and fastening means are provided for fastening a screen serving as projection surface to the wall. In the case of movable video devices, for example, video projection devices which are to be used in various rooms in a conference center, the first component group exclusively can be fastened in every room to the ceiling and, because of the simple connection by light-conducting fibers, the second component group can be connected only in the room in which the video projection device is to be used. In this case, a minimum number of laser devices will be sufficient for different conference purposes in the conference center, which sharply reduces costs for outfitting with laser projectors of this type.

In another advantageous further development, especially when small lasers such as solid-state lasers are used, it is provided that the first component group and the second component group are combined in a housing and this housing has fastening means for fastening to a wall, ceiling or floor of a room.

However, in another advantageous further development of the invention which is particularly suitable for conference centers of the type mentioned above, a holding device is provided at the edge, especially the upper edge, of the projection surface at which the first component group is fastened so as to be off-center with respect to the projection surface, so that the video image is displayed at an angle.

In this case, the first component group is fixedly connected with the projection surface and the entire projection surface with the firste component group and, as the case may be, also the second component group, can be moved from one room to another. This likewise economizes on the cost of a plurality of first component groups, one for each room.

In this further development, the entire video system and especially the projection head is also always precisely aligned with respect to a screen, mentioned by way of example, serving as projection surface, so that there is no need for adjustment work for operating in different rooms. In this case, the entire video system should also be mounted on rollers to facilitate transport.

A video projection system including, in particular, the invention and its further developments substantially comprises an electronic control unit, an input module, a control circuit for image point scanning and line scanning, and a device for image calculation. Further, the images should be written continuously, so that a brightness-modulated and color-modulated collinear light source should be provided which couples light into a deflection system, wherein the deflection system should be biaxial for displaying video images. In particular, advantages are provided with respect to angular magnification when magnification optics are provided, as will be seen from the following embodiment examples. In this case, the biaxial deflection system can comprise, for example, a nutating mirror or a line mirror and a frame mirror or can comprise one or more nonmechanical deflectors or a combination of different deflectors. In particular, the magnification optics should be corrected in accordance with the tangent condition so as to be free of distortion, and the origin of the beam deflection should lie, actually or apparently, in the deflection system, so that the deflection is carried out from one spatial point in practice. The projection surface required for displaying the image can be arranged for rear projection or front projection.

For the purpose of carrying out the method according to the invention in a particularly advantageous manner, the control circuit for image point scanning and line scanning should calculate a geometry-optimized image point scanning function both in the line direction and frame direction depending on the parameters of the deflection system, on a diagonal position in two angular directions, and on the surface shape of the projection surface. Thus, a new calculation of the image is carried out in particular in the unit for image calculation by these optimized scanning functions based on the incoming video data.

The invention and the further development involve both method features and device features for the correction of line spacings. Accordingly, on the one hand, the tangent error in the frame direction and different line spacings with diagonal projection can be corrected. On the other hand, a scaling of the line length is to be carried out. This also includes corrections for pincushion distortion for a biaxial scanning arrangement and a correction of the line length resulting from diagonal projection. It is further provided that the image point spacings within each line are corrected in such a way that the image distortion due to the tangent error in the line direction and a diagonal projection can be corrected through variably adjustable image point spacings between two adjacent image points. In addition, the correlation of the video information relative to the scanned pixels of an image can be determined in such a way that an image which is extensively free from distortion is obtained by means of a recalculation of the image taking into account the distorting effect of the projection surface and the distorting effect resulting from the position of the projector relative to the projection surface. Therefore, as will be clear especially from subsequent embodiment examples, a diagonal projection can also be corrected in the line direction in a simple manner. This diagonal projection in the line direction is reduced to a diagonal projection in the frame direction.

In order to achieve optimum image quality, a correction of the line spacings, line lengths, and image point spacings is carried out initially, followed by a complete recalculation of the image points corresponding to the corrected scanning geometry. Based on the complex of possibilities mentioned herein, a very high image quality is achieved with respect to faithful reproduction of detail and color purity. This is also highly desirable especially when arrangements of this type are used for CAD or printing technology. On the other hand, it is also possible to deliberately distort a given image content by means of the methods indicated herein in order to achieve intentional effects for image display. This can be advantageous particularly for advertising and entertainment applications in order to achieve special optical effects to attract the attention of the viewer.

The image distortion correction and image distortion according to the invention is made possible through comparatively simple techniques. Some of the corrections indicated hereinafter are carried out exclusively by means of computer programming steps in electronic units which are, in part, already provided in known projection systems. The extra expenditure on additional units is negligible. However, it is not necessary to manipulate the optical channel, which is a decisive advantage compared with known systems in which, for example, in order to prevent loss of image points, the image point raster of the LCD matrix could be selected in a suitably distorted manner.

It is possible to achieve a wide variety of display effects by the methods and arrangement shown herein. These display effects will generally consist in reproducing the original image contents on the projection surface with as little distortion as possible.

By means of the methods presented in this context, an image can be pre-distorted within wide limits corresponding to the distorting effect of the image generating system, the position and direction of the image generating system relative to the projection surface, and the distorting effect of the projection system relative to the projection surface of the screen. In this case, an image which is free from distortion to a very great extent can be displayed, for example, even on an irregularly shaped projection screen. The basis for this consists in that the distorting effect of projection on the projection surface can be determined and that the projection system is capable of purposely changing the image composed of image points in lines by means of the results so determined.

A first excellent advantage of a projection system working with collinear laser beams that are deflected in an angle-proportional manner consists in that the image sharpness is not dependent on the projection distance. In this case, the image size increases in proportion to the distance between the projection head and the screen. This eliminates a disadvantage of known image projectors in which a sharp image can only be displayed in a limited depth area.

A further advantage of a video projector system which works with scanned collinear light beams is that there is no need for a fixed predetermined relationship between the video data at the input of the projection system and the RGB image data at the electronic output of the system.

This applies to the time sequence as well as to the spatial allocation of the image information. Accordingly, it is possible, when the distortion characteristics of the image generating system and projection surface are known, to take these distortion characteristics into account with the incoming video data stream in real time and to read out pre-distorted RGB image data.

The RGB light beam bundles are modulated with respect to brightness, color and direction in such a way that a very extensively sharp, undistorted image or a sharp, deliberately distorted image can be displayed on a projection surface having virtually any shape. Limits are imposed only by the degree of inclination or curvature of the projection screen, since reflection conditions and scattering conditions prohibiting a high-quality image display on conventional projection screens occur when the angle between the incident light beams and the normal to the projection surface exceeds approximately 45°.

However, known projection screens exist with which larger projection angles can be used for generating images (screen according to U.S. Pat. No. 4,003,080).

It is further possible, in the case of fixed predetermined projection ratios, to store video information on a data medium so as to be pre-processed already with the information containing the desired distortion, so that a real-time processing of the incoming video data supplied to the projector is not required, enabling a considerable reduction in the cost of the projection system.

However, in a further development of the invention, the information for the correction of the line length within an image and the correction of the image point spacings within a line is recorded in the storage medium and transmitted directly to the projection system after readout of the video information from the storage medium. The storage medium can be a videotape, for example.

In this case, the video projection system requires only one circuit which obtains from the video data stream the control signal for the line spacing, with respect to the example for deflection of the frame mirror, and a control signal for the image point spacing, with respect to the example for modulation of the image point frequency. Since this construction always relates to specific applications, no problems are caused by the need to impress additional control signals on video information that is standardized per se.

It is further provided that a subassembly of the video projection system, namely the projection head, can be moved within the room while the image is being projected. This movement information can also be contained on a storage medium. It is accordingly ensured that the image display is corrected for the precise position occupied by the projector in relation to the projection surface.

The invention will be described more fully in principle hereinafter with reference to embodiment examples in connection with the drawings.

DESCRIPTION OF THE PREFERRED EMBODIMENTS

Figure 1:
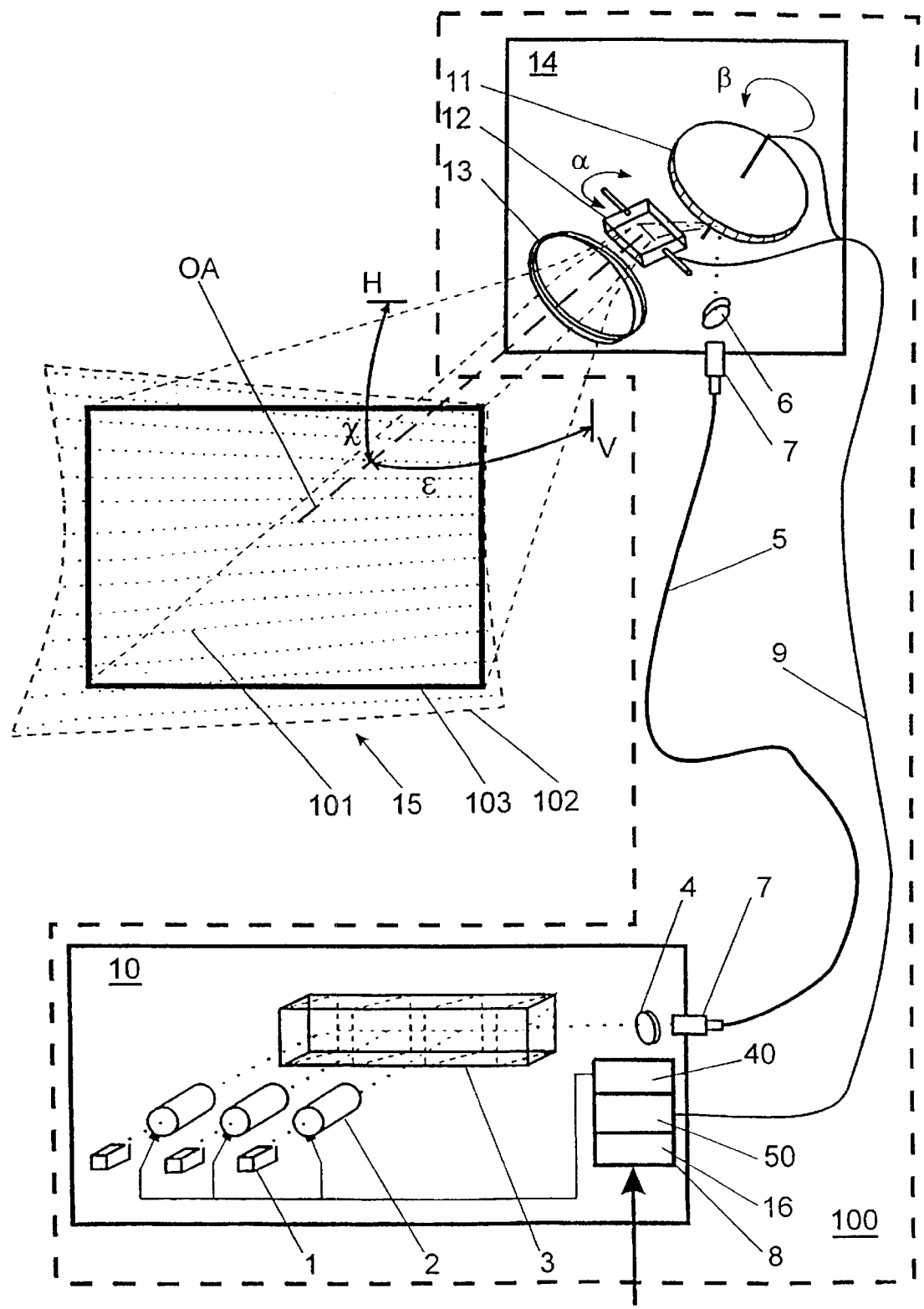
FIG. 1 shows an embodiment example for an arrangement according to the invention.

FIG. 1 shows schematically an arrangement 100 with reference to which the essential method features can also be explained. Various components were combined in component groups 10 and 14 in this arrangement. Component group 10 receives, via an input, a video signal (VIDEO in) which is to be displayed by front or rear projection on a projection surface 101 as a video image. In an embodiment example, this projection surface 101 was constructed as a screen in a frame with feet to which are attached rollers by means of which the entire arrangement shown in FIG. 1 can be moved and thus transported, for example, into other rooms.

The video image is projected by a projection head 14 representing a first component group which was arranged at an arm fastened to the frame in the embodiment example of FIG. 1. The arm can be folded in for transporting the arrangement 1 so that the entire arrangement could also be moved through narrow doorways. Component group 10 was likewise fastened to the frame.

Component group 10 communicates with the projection head 14 via an electric cable connection 9 and a light-conducting fiber 5. In the arrangement shown in FIG. 1, the image is displayed in the following manner:

The light sources 1 shown in component group 10 emit continuous light which is intensity-modulated with respect to color and brightness of the respective image point to be written via modulators 2 corresponding to the "VIDEO in" signal. Subsequently, the light bundles proceeding from the modulators 2 are combined by a beam combiner 3 which, in the embodiment example, is formed of a system of dichroitic mirrors, so that all of the light bundles coming from the light sources 1 are combined in a common bundle of light for illuminating the image points making up the video image. This common light bundle is then coupled into the light-conducting fiber 5 via input coupling optics 4, this light-conducting fiber 5 being inserted into the component group 10 via a socket 7. The light transmitted by the light-conducting fiber 5 is thus introduced into the component group constructed as a projection head 14 via the additional socket 7.

The socket 7 in the projection head 14 is so oriented that the light emerging from the light-conducting fiber 5 impinges on output coupling optics 6 through which the light bundle is made parallel again and introduced into a deflection device which is formed of a line mirror 11 and frame mirror 12. The line mirror 11 was a polygon mirror allowing only fixed times T for each line, while the frame mirror 12 was constructed as a tilting mirror. A linewise deflection is carried out by the line mirror 11 and a framewise deflection is carried out by the frame mirror 12. The two mirrors and the modulation in component group 10 result in an image formed in a manner similar to standard televisions, wherein, however, instead of light, one or more electron beams are intensity-modulated and deflected in two dimensions for displaying different image points on the projection surface.

Further, the projection head 14 has magnification optics 13 for enlarging the image. Chromatic aberrations are compensated in these magnification optics 13, and it is corrected in particular according to the equation $$\tan \alpha = K \tan \alpha',$$

where $\alpha'$ is the angle of the incident light bundle and a is the angle of the exiting light bundle. The factor K is referred to hereinafter as the magnification factor.

The optical axis of the construction in the projection head 14 is designated in FIG. 1 by "OA". This optical axis OA is inclined by two angles $\chi$ and $\epsilon$ relative to the surface normal of the projection surface 101, for which reason there occur geometric distortions, the correction of which will be described more fully hereinafter. Reference is had in particular to the perspective view in FIG. 2 for the position of angle $\chi$.

The "VIDEO in" signal is prepared by the electronic control device 8 for deflection as well as for intensity modulation. This is carried out in particular by an input module 16 and a control circuit 18 for the image point scanning and line scanning which essentially makes use of the synchronization signals in the video signal to control the line mirror 11 and frame mirror 12 synchronously with the modulation. An image storage was specially provided in the embodiment example of FIG. 1 for storing the image. The line mirror 11 and frame mirror 12 synchronized a clock generator by which the corresponding image point information was read out of the image storage. Further, a device for image calculation 17 was used for readout, wherein the respective correct image points for the geometric distortion correction and blanking mentioned above were generated by this image calculation 17. This device 17 will be described in more detail hereinafter.

Figure 2:
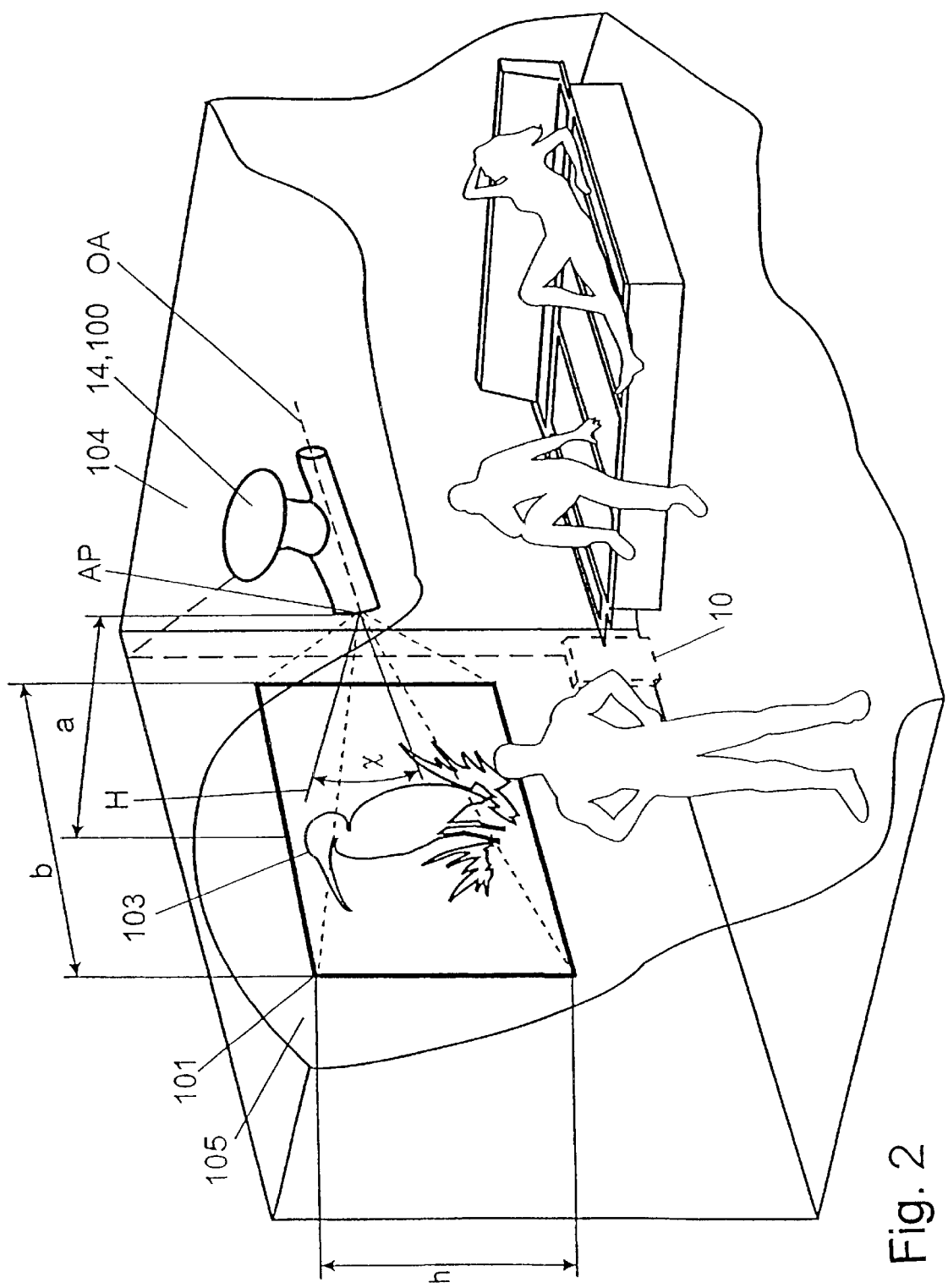
FIG. 2 illustrates a possible use of the arrangement of FIG. 1 for projection of images in a room.

FIG. 2 shows an embodiment example in a perspective view in which the above-mentioned angle $\epsilon$ is set at zero, wherein the device is primarily set up for stationary operation. The projection head 14 is arranged on a ceiling 104 of a room. The projection of an image 103 is carried out at an angle of inclination $\chi$ on a wall 105 which has the optical characteristics of a projection surface 101. The scattering of light in a large solid angle which is required in projection surfaces was achieved by applying an appropriate paint of suitable roughness to the projection surface 101.

The component group 10 arranged on the floor to the side of the wall also contains the operating controls. When very small lasers or lasers of very light weight are used, this arrangement can also be changed so that the lasers and electronics are also located on the ceiling in a shared housing with component group 10 and, in this case, the entire arrangement 100 is fastened to the ceiling. In this case, the arrangement 100 is controlled by remote operation, for example. Both possibilities are identified in FIG. 2 by the dashed line between component group 10 and the component group with the alternative reference numbers 14 and 100.

Further, FIG. 2 shows values a and b which will be used for formula calculations hereinafter. Value a is the distance of the projection head 14 from the projection surface 101, and b is the displayed image width. In the embodiment example, the projection distance a equals 1.3 m, and an angle of inclination $\chi$ of $-15°$ is provided. The dimensions indicated above made possible a distortion-free image with an image height of 1.5 m and an image width of 2.7 m.

In another embodiment example, angle $\chi$ was $-25°$ and value a was 2 m, giving a=2 m, b=2.8 m, and $\chi$=2.1. The distance of the upper edge of the image from the ceiling was 15 cm. In rooms of usual dimensions, almost the entire wall can be filled with image content by a system of this kind.

As can also be seen from the view in FIG. 2, considerable advantages result from this type of setup of the projection device with respect to the freedom of movement of persons present in the room. The possibility of shadows caused by persons standing between the projector and the projection surface is drastically reduced as a result of projection from the ceiling. Accordingly, for a solution in which persons are protected against health risks due to laser radiation, requirements are reduced compared with video projection devices from the known prior art and the required safety can be realized in a simpler manner overall.

It is essential for diagonal projection that the distortions caused thereby can be corrected. These distortions are due to varying distances between the exit pupil of the light source and points on the projection surface. Therefore, different angles also result in different paths on the projection surface 101.

Distortions of the type mentioned above can be corrected by the method according to the invention. Various correctable distortions will now be described with reference to FIGS. 3 to 6.

Figure 3:
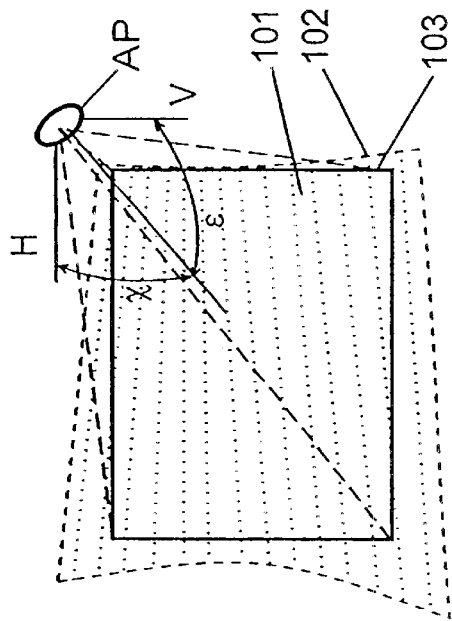
FIG. 3 shows a schematic view for diagonal projection to illustrate the method.

FIG. 3 shows how a rectangular image would generally be displayed when projecting onto a projection surface 101 if the projector were arranged centric to the upper side of the projection surface 8 at an angle $\chi$ to the projection surface 101. The upper edge of the image, designated by 20 in FIG. 3, would be substantially shortened compared with the lower edge 21 of the image, whereas the vertical side boundaries 22 of the rectangular image would extend diagonally between these edges resulting in the trapezoid shown in FIG. 3.

With respect to the lateral lines, the phenomenon of slope lines is also referred to in the field of photography. This phenomenon is known and derives from the fact that the lower edge of the image 21 is at a greater distance from the projector than edge 20, as a result of which the identical projection angle of the objective results in different lengths of edges 20 and 21 on the projection surface 101.

This trapezoid distortion, as it is called, normally produces the projection geometry shown in FIGS. 1 and 2. The arrangement shown in FIG. 2 with a projection head 14 at a distance from the center of the projection surface 101 is only possible when a suitable method of compensating for distortions of this type is used.

A compensation method of this kind could consist in a corresponding shortening of the lines of a video image so that the geometrical line 21 is the same length as line 21 on the projection surface.

However, in television technology, there is generally a risk of image point loss in this case, since the image point resolution in conventional technology depends on a matrix—either the LCD matrix of the prior art mentioned above or a shadow mask of an electron beam tube required for the display of color pictures. When an image is projected by image generating systems of this kind on a projection surface, lines can only be shortened in order to compensate for distortion at the cost of a loss of information in a line.

Therefore, a different method is suggested for the arrangement according to FIGS. 1 and 2, this method having already been described in detail with reference to these Figures. In this case, a parallel light bundle is continuously scanned over the projection surface 101. Because of their extensive parallelism and output density, lasers are well-suited for generating this light bundle.

The basic construction of video projection devices of the kind mentioned above with a continuous deflection of the light bundle is known, for example, from DE 43 24 849 C2 and DE 43 24 841 C2. Reference is made expressly to these texts and to the prior art contained therein with regard to the technical realization of a laser system of this kind.

In this case, it is essential for compensation of the distortions shown in FIG. 3 only that the light bundle for the illumination of image points can be directed to any point on the projection surface 101 because of the characteristic of this image generating system. This is possible because this technique does not rely on a spatially fixed image point raster. The compensation made possible by this technique will be described more fully hereinafter with reference to FIG. 3.

Figure 5:
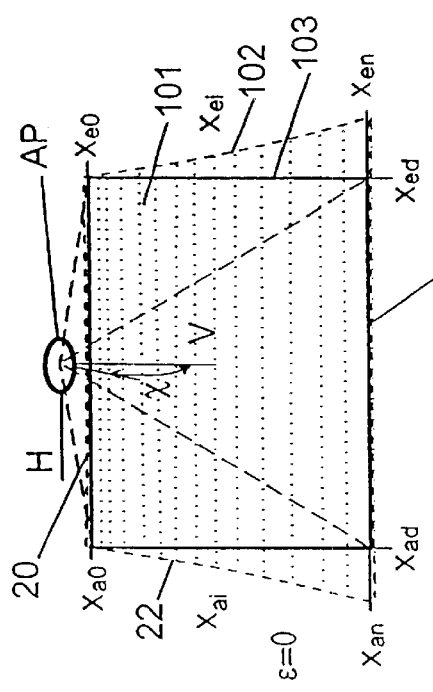
FIG. 5 is a schematic view of so-called pincushion distortions.

In FIGS. 3 and 5, the first image point of the 0th line is indicated by $x_{a0}$ and the last image point by $x_{e0}$. The last line, that is the nth line, starts at $x_{an}$ and ends at location $x_{en}$. An ith line with starting point $x_{ai}$ and $x_{ei}$ is designated therebetween by way of example.

In the method according to the invention, a rectangular segment 103 extending from a variable $x_{ed}$ to a variable $x_{ad}$ is cut out of the total possible trapezoidal raster area as is illustrated in FIG. 3. In this case, scanning is carried out only from $x_{ad}$ to $x_{ed}$ for the compensation of each line. The illustrated values $x_{ad}$ and $x_{ed}$ were selected as extrema.

Naturally, $x_{ad}$ can be selected somewhat larger and $x_{ed}$ can be selected somewhat smaller; as concerns the selection, it is only important that $x_{ed}$ is less than the minimum of $x_{ei}$ and that $x_{ad}$ is greater than the maximum of $x_{ai}$, where $x_{ed}$ must be greater than $x_{ad}$.

In the compensation according to one of the possible methods according to the invention, the line scanning in the projection head 14 is carried out at a uniform line time T, wherein blanking is carried out in the time segment in which the light bundle would impinge between points $x_{ai}$ and $x_{ad}$ on the projection surface 101, while the entire line content is projected on the projection surface 101 in the area from $x_{ad}$ to $x_{ed}$ in the correct location with respect to the image points, while blanking is carried out again for the remaining period when scanning from $x_{ed}$ to $x_{ei}$.

Since the video signal provides the image point information of each line in the same time intervals according to applicable video standards, it is advisable for purposes of synchronization of the video signal to provide a storage in which this image point information is first written and then read out synchronously and in conformity to the image points for scanning between locations $x_{ad}$ and $x_{ed}$.

Continuously operating lasers, especially gas lasers, were used in the embodiment example. In so doing, the different speed at which image points are written is taken into account by scaling the brightness with respect to the illumination times of the image point, as was already described above.

In order to enable the corresponding image resolution, the diameter of the light bundle which is greatest at edge 21 is selected in the example shown in FIG. 3 in such a way that the image resolution required by the video standard to be displayed is achieved. On the other hand, this means that the resolution made possible by the diameter of the light bundle is higher when scanning line 20. This can be made use of in an advantageous manner in that the storage for the image points in line 20 is configured for a larger quantity of image points than required by the video standard. In this case, for example, the line information for the additional image points that are required can be interpolated by means of an algorithm for increasing resolution.

This does not necessarily result in an information gain because the total information in a line is also limited by the bandwidth of the video signal. But for this reason it is generally also sufficient to scan the analog video signal introduced on the "VIDEO in" line shown in FIG. 1 at a higher frequency than the image point frequency of the video standard. The scanning of the analog signal then automatically results in intermediate values for which further algorithms for interpolation can be dispensed with. The storage in which the video information for the synchronization of the asynchronous writing in interval $[x_{ad}; x_{id}]$ is stored then contains a greater number of storage locations for the lines than is given by the number of image points per line according to the video standard, and the scanning for writing in is carried out at a correspondingly higher frequency.

As was shown with reference to FIG. 3, a projection head 14 arranged vertical and centric to the projection surface 101 results in a symmetrical trapezoid for the image distortion. However, if the projection device is arranged at the upper right-hand corner of the projection surface 101, where $\epsilon \neq 0$, as is shown in FIG. 1, the trapezoid is no longer symmetric and the shape shown in FIG. 4 results instead. This can also be corrected for distortion by the method according to the invention, although additional steps must be taken, as will be described more fully hereinafter.

Usually, however, other errors can also occur in a straight-line projection which are caused, for example, by image errors of a biaxial deflection system. In the example shown in FIG. 5, a distortion of this kind is indicated by the outline for the distorted surface 102. This so-called pincushion distortion vertical to the line direction can also be compensated, as in the case of trapezoid distortion, by means of the method with correspondingly selected values of $x_{ad}'$ and $x_{ed}$ and corresponding blanking.

Figure 6:
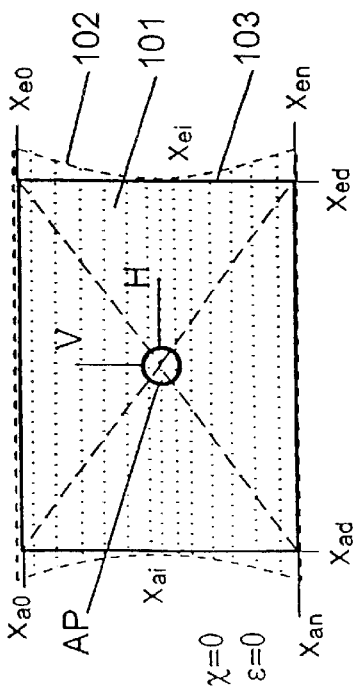
FIG. 6 illustrates another distortion caused by diagonal projection.

Further, FIG. 6 also shows an example for a distortion which results when the angle $\chi$, described above, is set at zero and $\epsilon$ is selected such that it is not equal to zero. This also results in a trapezoid distortion which cannot be eliminated by a line correction alone, as also in the embodiment example of FIG. 4 in which both angle $\chi$ and angle $\epsilon$ are not equal to zero.

Nevertheless, this method can also be used for the correction of such distortions as will be shown hereinafter.

FIGS. 3 to 6 show ellipses which illustrate the exit pupil AP for the output of the light bundles, in this case, laser beams. Reference numbers 102 and 103 are again used. In this regard, reference number 102 designates the uncorrected distorted image, reference number 103 designates the image corrected according to the method, and reference number 101 designates the projection surface.

Figure 7:
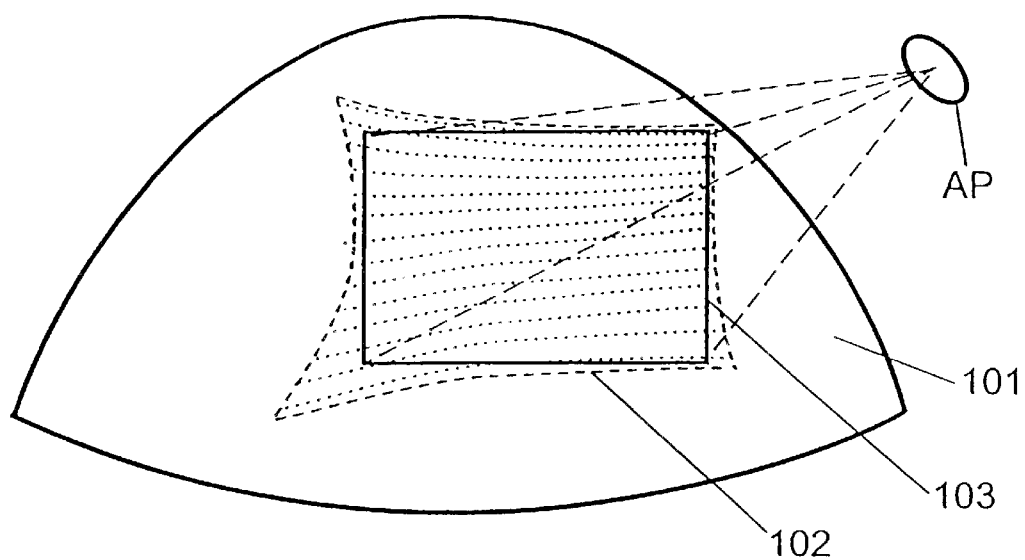
FIG. 7 illustrates projection on a curved projection surface.
Figure 8:
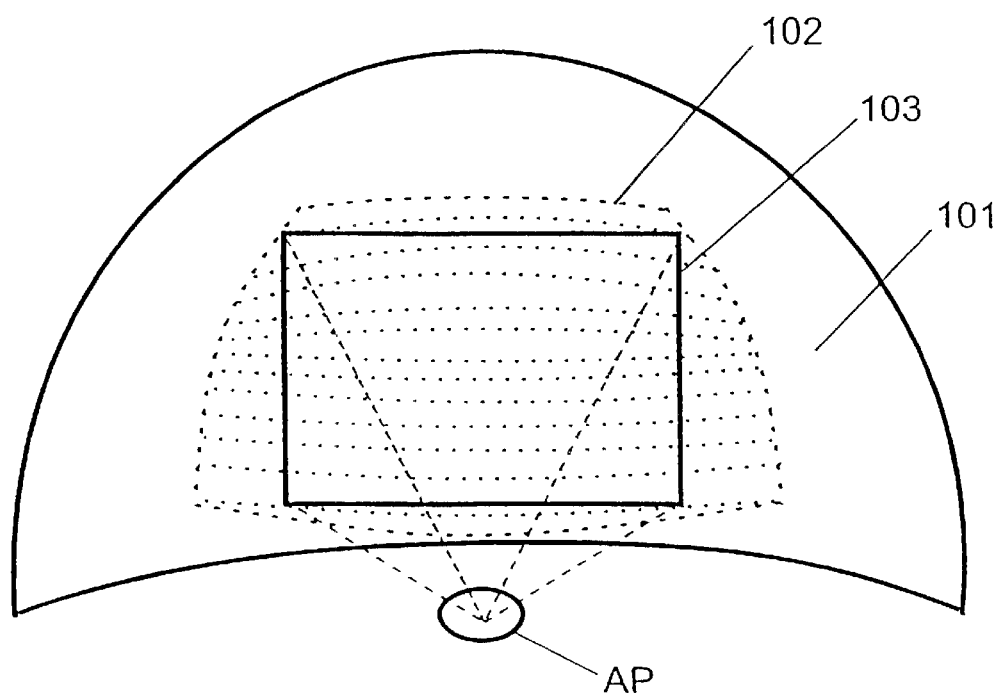
FIG. 8 is an illustration of projection in a curved projection surface.

The method which was described above with reference to flat projection surfaces is also applicable to round or dome-shaped projection surfaces such as those provided in planetaria or flight simulators, for example. In this case, a distortion generally already results due to the different angle of each surface element on the surface of the projection surface 101 relative to the projection head 14. Examples of this are shown in FIG. 7 and FIG. 8, wherein FIG. 7 shows projection on the outside of a projection surface and FIG. 8 shows an example for the inside of the projection surface. In particular, FIG. 8 shows a geometry which is common in planetaria and flight simulators. The previous reference numbers with the indicated surfaces are also used in this case to designate the same content. The two Figures are accordingly self-explanatory and the content of the Figures is expressly referred to in this respect.

The far-reaching possibilities of the method allow virtually any geometric distortion to be compensated, and this compensation is limited essentially only by the required resolution and the achievable beam diameter of the light bundle. Therefore, this method is substantially more flexible than the compensation methods known from the prior art in which compensation is no longer possible at very large angles because of the great loss of information due to the reduction of image points.

The projection head 14 will be described more fully with reference to FIG. 1 for a better understanding of the technique. The light which is parallelized by the output coupling optics is projected onto the respective facet of the line mirror 11 which is located in front of the optics and which rotates about its axis of rotation at a uniform speed. A uniform line scanning with identical line times T is achieved in this way. A frame mirror 12 which is constructed as a tilting mirror and is moved back and forth at the frame rate is provided for frame deflection. The light bundle proceeding from the frame mirror 12 impinges in magnification optics 13 which comprise an afocal lens system, so that the light bundle entering the magnification optics 13 in a parallel manner can exit again as a parallel light bundle. This afocal lens system is compensated according to the tangent condition. In particular, this means that the ratio of the tangent of the output angle to the tangent of the input angle is constant. In the embodiment example, the value of this constant is 3.5.

Due to the possibility by which virtually all distortions can be favorably compensated for in the indicated method, it should be assumed that the orientation of the optical axis OA of the magnification optics 13 is irrelevant. However, it has been shown in practice that a particularly high resolution is achieved when the magnification optics 13 are adjusted with their optical axis in the center of the image to be displayed, that is, approximately on the center line and on a position at $(x_{ed}+x_{ad})/2$.

In the embodiment example, the control signals for the rotating mirror 11 and swiveling mirror 12 and the power supply for these deflection devices are transmitted and supplied, respectively, via cable connection 9.

As was already mentioned above, the video information of a line is initially stored in a storage which is then read out synchronously with the display depending on the distortion with respect to the homogeneous image point density. The readout can be initiated by circuits which deliver a clock signal to an output 25 whenever a new image point is written on the projection surface 101, that is, when the color or brightness for a new image point to be displayed is to be read out of the storage for modulation of the light bundle.

Figure 9:
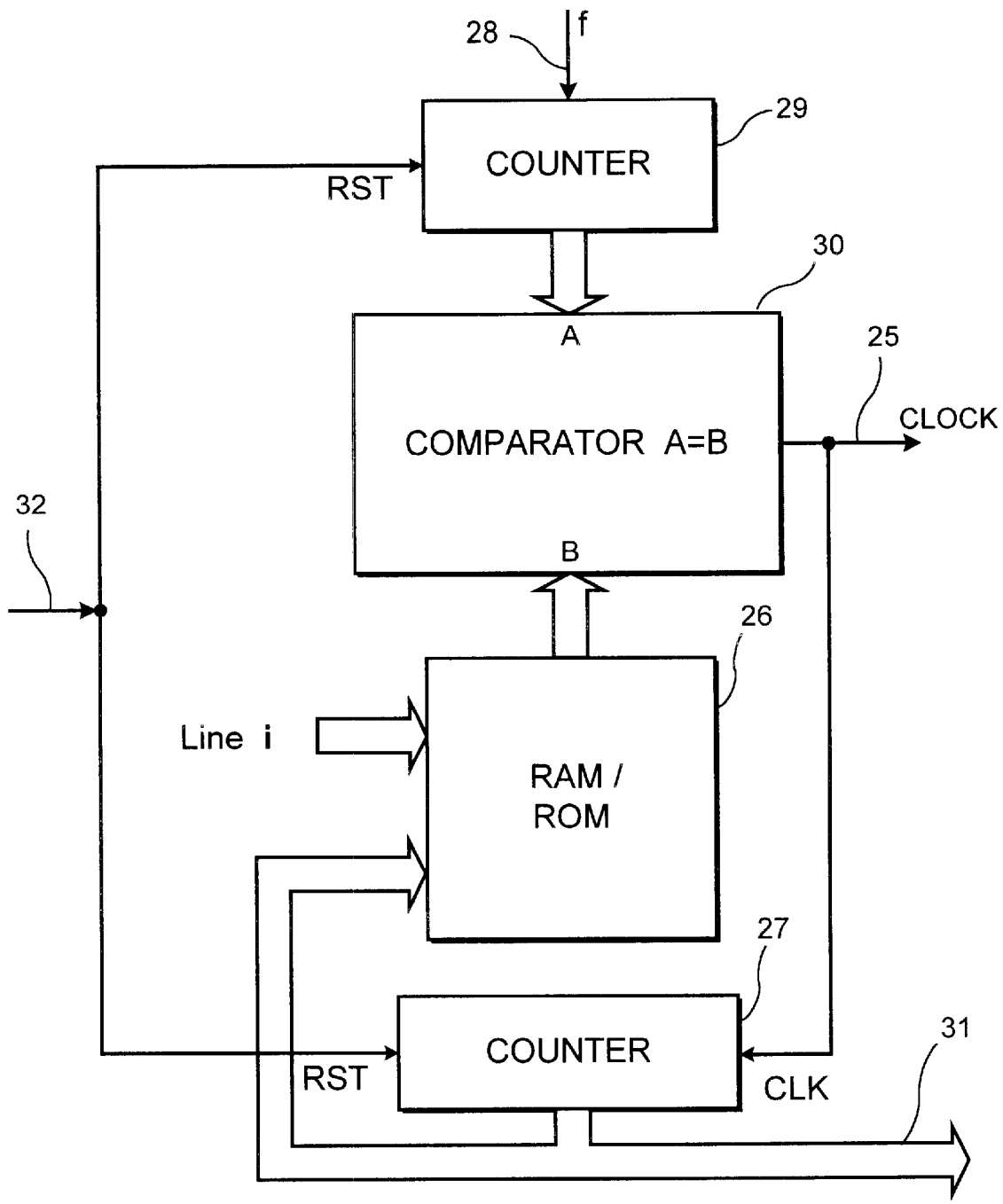
FIG. 9 is a digital circuit for generating clock pulses for controlling the time response for the readout of image points in a line.
Figure 10:
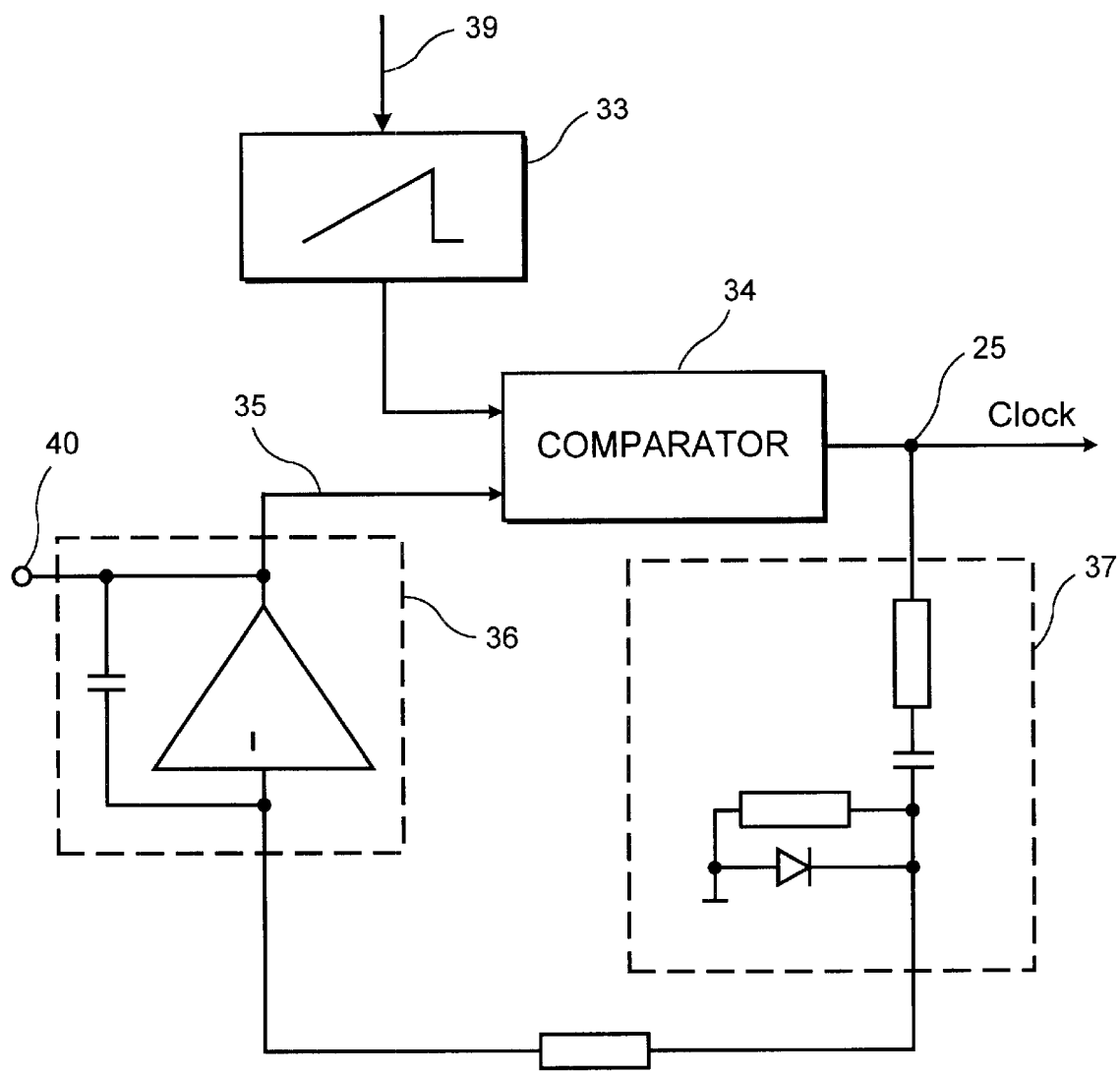
FIG. 10 is a circuit similar to that shown in FIG. 9, but constructed as an analog circuit.

FIG. 9 shows a digital circuit for generating the clock signal to the output 25, while FIG. 10 shows an analog circuit that can be used for this purpose.

A storage 26 is provided for control according to FIG. 9; this storage 26 is a RAM in cases where the compensation should be changeable for different situations. This may be advisable, for example, in various arrangements of the projection head 14 relative to the projection surface 8. The required information is then stored depending on the conditions given by the case of application. In examples such as that of the framed projection surface 101 with a projection head 14 at an arm, in which the geometry is always fixed because of the constant position of the projection head 14 relative to the projection surface 8, this storage can also be a ROM.

This storage is addressed once by a binary word (line i) which indicates the line i which is actually being imaged. Additional address lines, for example, for the lower bit values of the addresses of the storage, are addressed by the output of a counter 27 which, in principle, counts up the image point of the line i that was imaged at the respective point in time.

Because of the fixed storage in the ROM or the freely programmable storage in the RAM, a binary word appears at the data output of the storage 26 characterizing the time point, calculated from the start of a line, at which the next image point is to be written. The digital word represents the time in units of the cycle of a frequency f which is delivered to the circuit according to FIG. 9 on a line 28. This frequency f should be a multiple of the image point frequency in order to obtain the most accurate possible position of the light bundle for distortion correction. The time expiring during the writing of a line is determined by counting the cycles of the frequency f with a counter 29. The time appearing digitally at the data output 27 of the storage 26 is compared with the expired time counted in the counter 29 by means of a digital comparator 30.

If the times are identical, a clock pulse is sent on output line 25 and used to read the next image point information out of the image storage with the predetermined line information. This clock pulse is simultaneously sent to the input of the counter 27 whose digital output value is then increased by one, whereupon the digital time value for the next image point is read out of the storage 26.

Further, the digital value for the counter state is guided out of the circuit shown in FIG. 9 at 31 and is used simultaneously for addressing the image storage for reading out the information content of an image point. The counters 27 and 29 are then reset by a signal 32 which is given at the respective start of the line so that a defined state is adjusted at every new line. Further, this line synchronization signal on line 32 is used to set the first image point in the storage for storing the video information and the last image point to "black" so as to ensure that the light bundle is always blanked in areas $x_{ai}$ to $x_{ad}$ and $x_{ed}$ to $x_{ei}$.

In order to be able to write the image point information as accurately as possible, the frequency f on line 28 should be a multiple of the line frequency of the video standard, as was already mentioned above. In this respect, it should be even greater than three-times, or even 10-times, the image point frequency. However, this requirement cannot be met in every case because of the limiting frequencies of the counter 29 and comparator 30 at very high image point frequencies.

In cases such as those mentioned above, an analog control according to FIG. 10 which does not rely on a digital precise representation of time is preferable. The time is given, according to FIG. 10, by a function generator 33 which generates a sawtooth at an analog output starting at the time at which the light bundle is directed onto the projection surface 101 on location $x_{ai}$. The steepness of the sawtooth is controlled in proportion to $1/(x_{ei}-x_{ai})$ via input 34. The output of the function generator 33 leads to an input of an analog comparator 34 whose other input 35 is connected with the output of an integrator 36. The output of the comparator 36 is clamped to zero via a line 40 at the start of every line.

In this case, also, as in the embodiment example shown in FIG. 9, the information "black" is applied to the first image point and the last image point in the storage for the line information for blanking the light bundle.

As soon as the voltage of the output of the function generator 33 exceeds the output voltage of the integrator 34, the latter generates a signal on line 25. This signal is transformed by a differential circuit into a spike pulse which is fed to the input of the integrator 36 so that its output voltage is increased. The output voltage on line 25 accordingly drops again because this voltage is now greater than the output voltage of the function generator 33. Accordingly, a new pulse occurs again on line 25 as soon as the output voltage of the function generator 33 is again greater than the integrator voltage.

There thus occurs on line 25 a clock signal for the readout of the image point information of the line stored in the storage, wherein the readout rate is controlled by the various line lengths given by the distortion based on the information added via control line 39.

The example described above was concerned with sawtooth-shaped voltage waveforms for uniform control of line information. In order to correct substantially nonlinear distortions in the image, which will be discussed hereinafter, the function generator 70 should show a signal waveform other than a sawtooth, depending on the desired function profile. This is made possible, for example, in that higher harmonics are added to a sawtooth as fundamental oscillation according to the desired phase and amplitude depending on digital signals on the control line 39.

As was already indicated in the descriptions for FIGS. 3 to 6 and as can also be seen from these Figures, the line spacings can also differ noticeably from one another. Although this error is barely detectable at small angles of $\chi$ and $\epsilon$, it is advisable in the case of large angles of inclination and high-resolving systems such as those for CAD applications to carry out a correction of this error as well.

This is made possible when the frame mirror 11 is operated diverging from a uniform change in angle as will be explained in more detail hereinafter.

Figure 11:
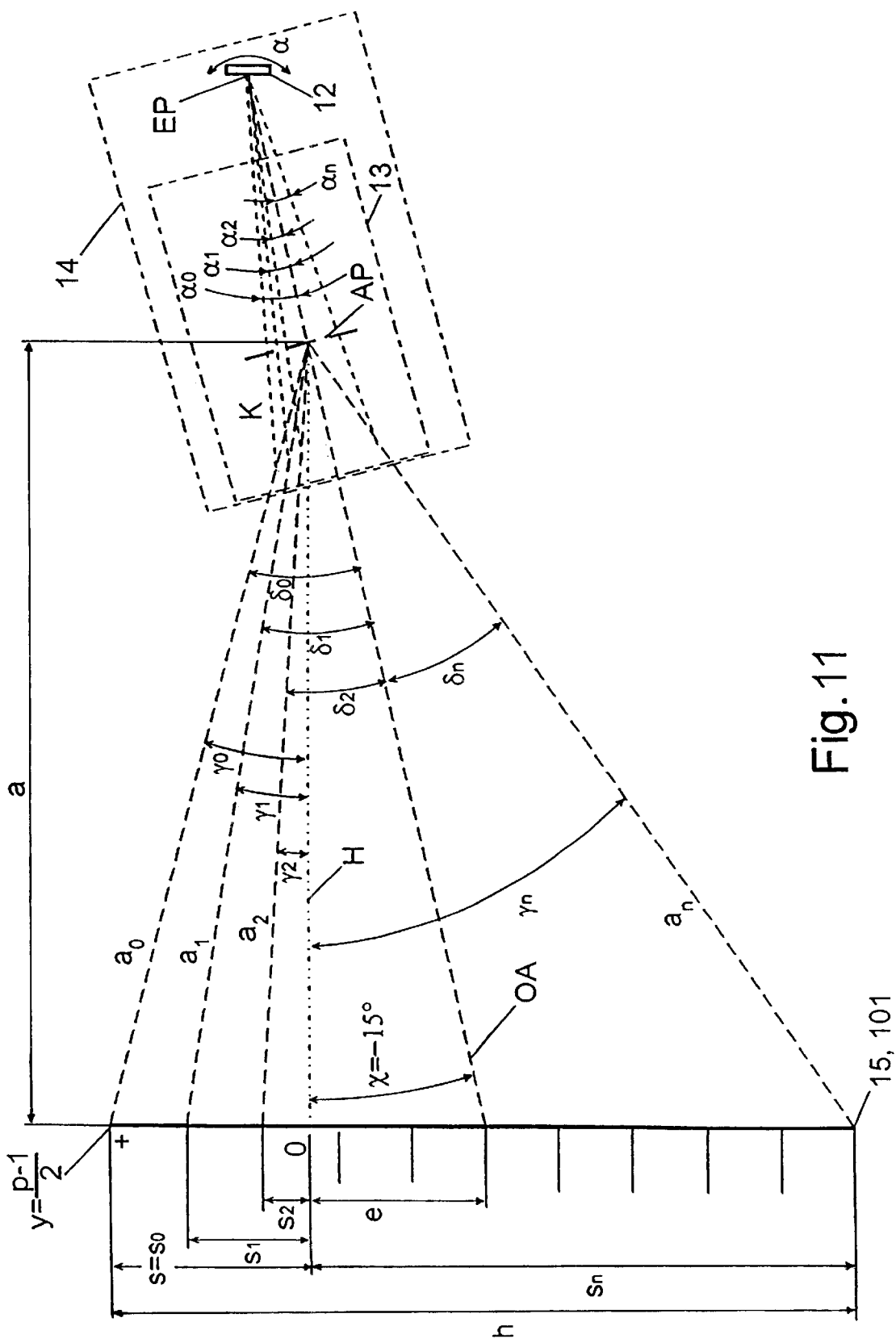
FIG. 11 shows a schematic view of projection at an angle for describing different mathematical relationships.

The important quantities for the following calculations are shown schematically in FIG. 11.

The projection angle χ is the angle between the projection axis, that is, the optical axis OA of the deflection system, and the normal, designated as horizontal H, on the projection surface 101. The reference point of the angle is the origin of the beam deflection, i.e., in this system with magnification optics 13, the exit pupil AP.

The angle limits are 0° (horizontal) to less than +/−90°, wherein a negative angle means that the projection direction in the embodiment example in FIG. 2 is oriented with respect to the floor. In contrast, a positive angle means that the projection device is oriented with respect to the ceiling.

The magnification optics 13 and the frame mirror 12 are arranged relative to one another in such a way that the entrance pupil EP lies in the origin of the beam deflection in the vicinity of the frame mirror 12. The start of the frame (1st line) is so defined that the lines are written from top to bottom viewed in the direction of light, which corresponds to the usual television standards. All statements are valid for front projection as well as rear projection on a projection surface 101.

The following are additional quantities which are shown in FIG. 11 and/or used in the following formulas:

Factor K is the magnification factor for the magnification optics 13. This can assume values ranging from greater than 0 to approximately 200, depending on the deflection system; practical values can range up to 10; in the example shown in FIG. 2, K=3.5. K=1 also describes the case in which no projection optics are used;

The exit pupil AP relates to the angle-magnifying projection optics 13. It is the deflection point of the light bundles after passing through the magnification optics 13. Without magnification optics 13, this spatially fixed deflection point can lie through the point of incidence of a laser beam on a beam-deflecting mirror.

Value a is the distance between the exit pupil AP and the projection surface 101. In the following computational examples, the distance a is standardized at 1 and the equations given later on can be applied, by corresponding multiplication, for values subject to dimensions for the configuration of different devices.

Value h is the height of the image;

Value e is the distance on the projection surface between the optical axis OA and the horizontal H measured on the projection surface 101;

Angle α is the optically active total deflection angle of the frame mirror 12;

Angles $\alpha_i$ designate the deflection angles of the frame mirror 12 with reference to the projection axis OA and the deflection point of the frame mirror for the respective line i;

Value s is the distance of the first line (start of frame) from the horizontal H on the projection surface 101;

Values $s_i$ are the distances of the lines i from the horizontal H;

Angles $\gamma_i$ refer to the projection angles between the straight lines |line i—exit pupil AP| and the horizontal H;

Angles $\delta_i$ are the projection angles between the straight lines |line i—exit pupil AP| and the optical axis OA behind the projection head 14;

The variable z refers to the quantity of lines z=n+1; and

The variable i is an index, where i=(0, 1, . . . , n) and n=z−1.

Various corrections for image distortions are described in the following with reference to FIG. 11.

A. Correction of line spacings due to the tangent error in the frame direction and with a vertical inclination χ of the optical axis OA of the projection head 14 relative to the projection surface 101 by means of the deflection angle $\alpha_i$ for every line i:

1. Determination of the distance s of the first line (uppermost line) from the horizontal H to the exit pupil (position of start of frame):
   Let the projection distance a=1 (standardized), wherein $h/2=\tan(\alpha/2)*K$ and $e=\tan(\chi)$, then $s=\tan(\chi)+\tan(\alpha/2)*K$, where
   χ is the inclination of the projection axis
   α is the deflection angle of the frame mirror
   K is the angular magnification.

The same spacings of the additional lines are calculated proceeding from this length determined by the distance s, resulting at the end of this calculation in various magnitudes of angular increments $\alpha_i$ of the frame mirror 12 per line.

2. Spacings $s_i$ of the respective line i=(0, 1, 2, . . . , n) from the horizontal H through the exit pupil on the projection surface (on the floor, from the horizontal to the exit pupil on the projection surface =negative magnitude, on the ceiling=positive magnitude):

$s_i=s-h*i/n$ $s_i=\tan(\chi)+\tan(\alpha/2)*K-2*\tan(\alpha/2)*K*i/n$, where
   i/n is the resolution in the frame direction (number of lines z=n+1) and
   h is the image height at distance a=1.

3. Projection angle $\gamma_i$ between the straight lines |line i=0, 1, 2, . . . n)—exit pupil AP| and horizontal H on the projection surface, calculated from the line spacing $s_i$ of every line:

$\gamma_i=\text{arc tan}(s_i)$ $\gamma_i=\text{arc tan }(\tan(\chi)+\tan(\alpha/2)*K-2*\tan(\alpha/2)*K*i/n)$.

4. Projection angle $\delta_i$ between the straight lines |line i−exit pupil AP| and the optical axis OA of the projection head with reference to the exit pupil AP of the magnification optics:

$\delta_i=\gamma_i-\chi$ $\delta_i=\text{arc tan}(\tan(\chi)+\tan(\alpha/2)*K-2*\tan(\alpha/2)*K*i/n)-\chi$.

5. Deflection angle $\alpha_i$ for every line i with reference to the optical axis OA of the projection head 14 and the deflection point of the frame mirror 12:

$$\alpha_i = \arctan\frac{\tan(\delta_i)}{K}$$

$$\alpha_i = \arctan\frac{\tan\left(\arctan\left(\tan(\chi)+\tan\left(\frac{\alpha}{2}\right)*K-2*\tan\left(\frac{\alpha}{2}\right)*K*\frac{i}{n}\right)-\chi\right)}{K}.$$

This function $\alpha_i=f(i, \chi, K)$ is proportional to the control voltage when the frame mirror is a tilting mirror as in the embodiment examples. If the magnification optics do not cause any change in the angle, then K=1. If no diagonal projection is carried out, then $\chi=0$, and when the angle $\alpha$ is controlled according to this equation, a correction of the tangent error is carried out in the frame direction exclusively.

Figure 15:
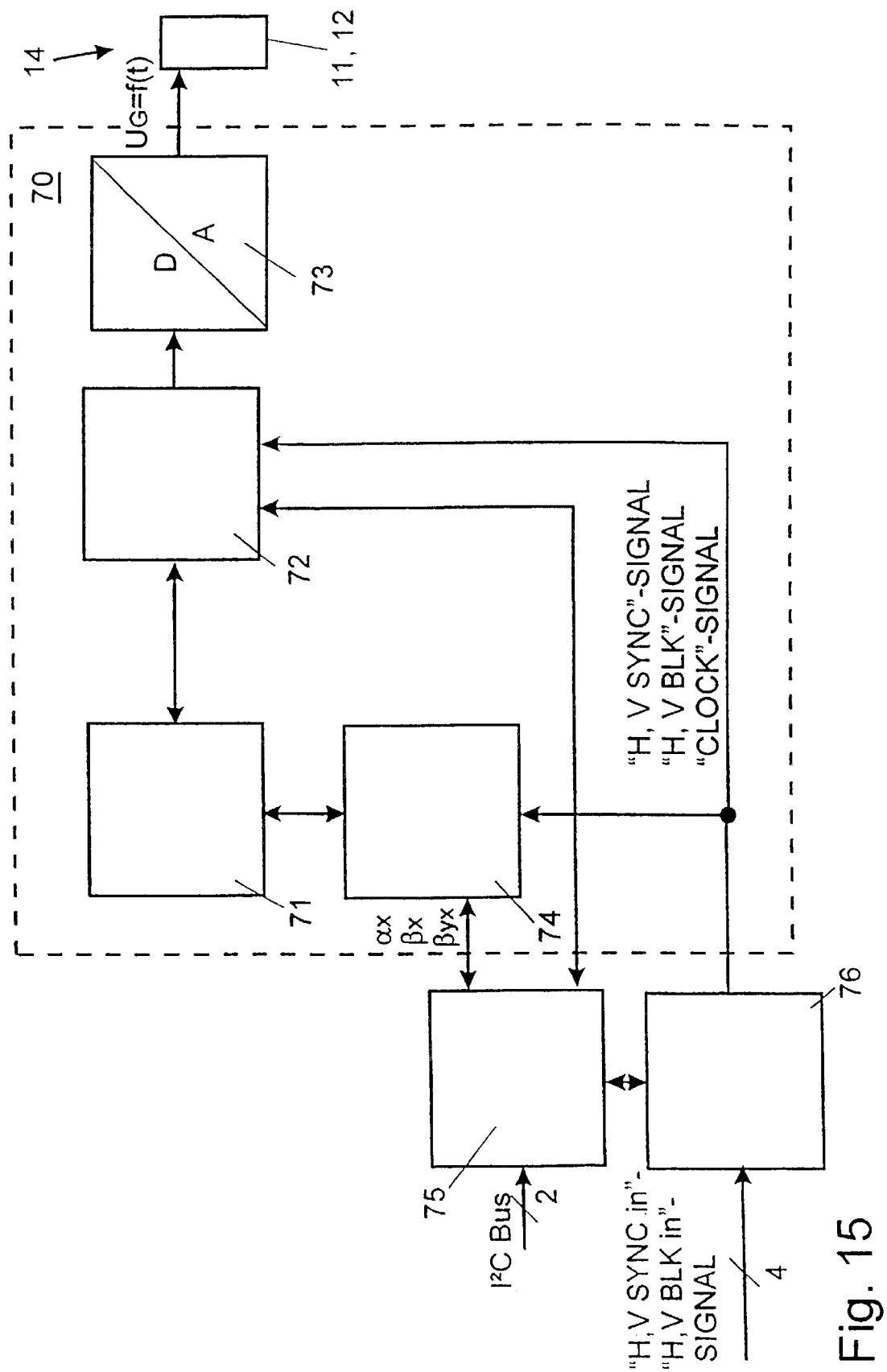
FIG. 15 is a control circuit for a deflection mirror constructed as a tilting mirror.

The calculations given in this case can be electronically simulated in a circuit arrangement according to FIG. 15. The frame mirror 12 is deflected for a frame scanning according to the angular deflection function $\alpha_i = f(i, \chi, K)$ in accordance with FIG. 16.

A distortion correction can also be carried out in a similar manner with respect to the image point density, that is, in the direction of the lines i, which can be important particularly in the case of very large angles $\epsilon$.

In a biaxial deflection system as in the embodiment examples, a so-called pincushion distortion error such as was shown with reference to FIG. 5 also always occurs. This pincushion distortion error is also superimposed on the error of the line length due to diagonal projection with angle of inclination $\chi$.

Figure 12:
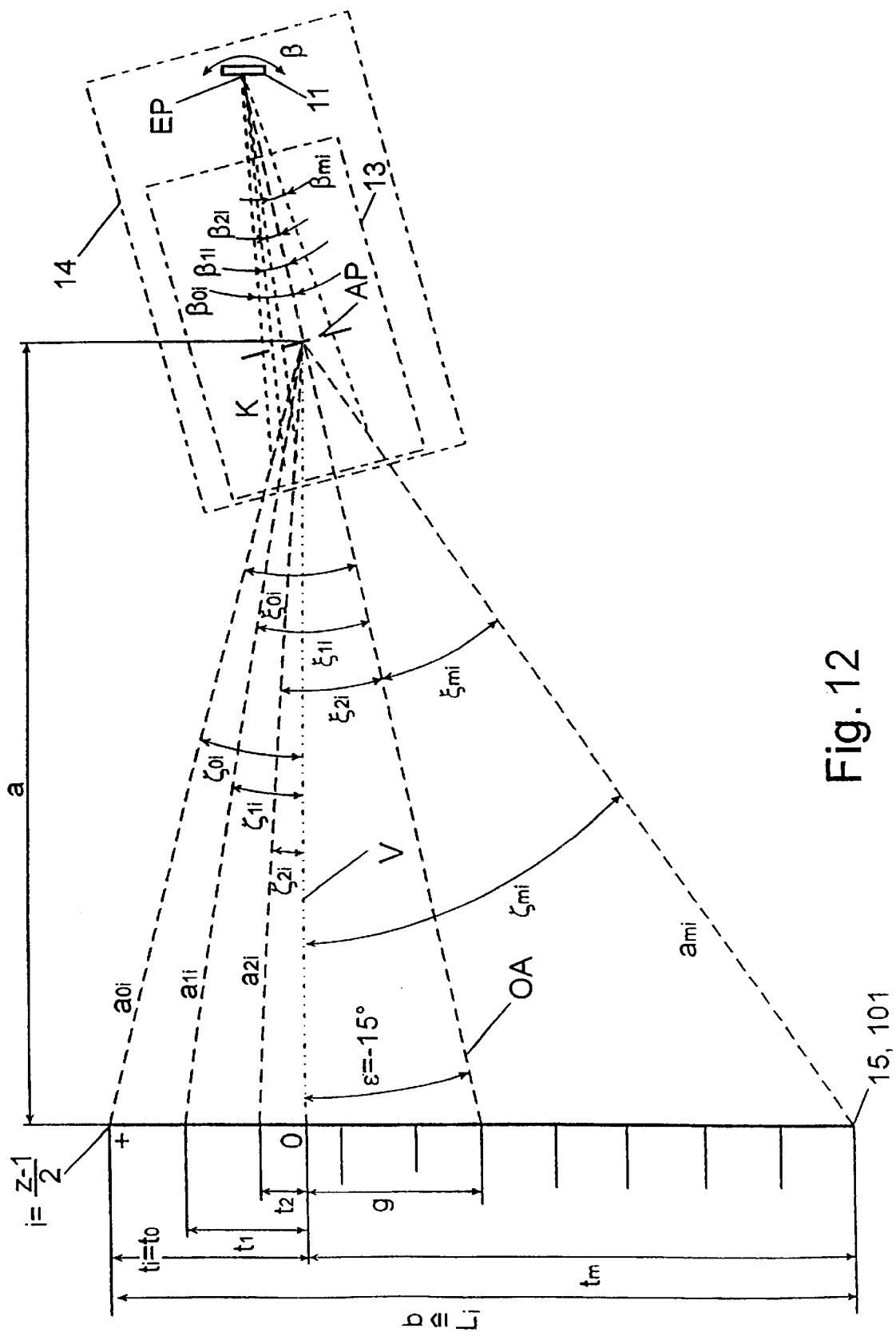
FIG. 12 is a schematic view at a different inclination of the projection head to the projection surface.

The corresponding values for the calculation of the corrections of the line lengths and image point spacings in every line are partially illustrated in FIG. 12:

Angle $\beta$ is the optically active total deflection angle of the line mirror

11. The angular magnification of angle $\alpha$, considered above, and angle $\beta$, considered in the present case, is determined from the (mechanical/optical) construction characteristics of the line mirror 11 and frame mirror 12 and from the aspect ratio of width b to height h of the image which was 4:3 in the embodiment example according to FIG. 1;

Angles $\beta_i$ are the deflection angles of the line mirror for every line i (line opening angle);

Values $L_i$ designate the lengths of the lines i and range in magnitude from $x_{de}$ to $x_{di}$;

Values $a_i$ are the projection spacings of every line i measured from the exit pupil AP to the respective line center;

The correction factor for the pincushion distortion is set at $c_i$;

Values $f_i$ are correction factors for the line length as a result of the vertical projection inclination $\chi$;

Values $R_i$ are the correction factors for the line length;

B. Correction of the line opening angle $\beta_i$, i.e., the line length $L_i$ of every line i in the image display:

1. Correction of the pincushion distortion of a biaxial deflection system for image point writing and line writing of images with a punctiform exit pupil and a frame deflection angle $\alpha$:

$$c_i = \cos(\alpha_i)$$

This correction factor $c_i$ also occurs in a straight-line projection ($\chi=0°$ and $\epsilon=0°$ according to FIG. 5) and in a diagonal projection with a projection diagonal ($\epsilon \neq 0°$ according to FIG. 4 and FIG. 6) and should be corrected for a distortion-free image. An advantage with respect to the system consists in that the angular magnification K of the projection optics 13 has no influence on this correction factor.

2. Correction of various line lengths as a result of a projection inclination $\chi$ (FIG. 4 and FIG. 6):

There is a linear dependency between the projection distance $a_i$ of a line i, measured from the exit pupil AP to the respective line center on the projection surface 101, and the line length $L_i$, which linear dependency corresponds to the image width $b = x_{de} - x_{da}$. The correction factor $f_i$ is the ratio of the projection distance of the line i with diagonal projection to the projection distance of the line i without diagonal projection:

$$a_i = \frac{a}{\cos(\gamma_i)}$$

$$f_i = \frac{\cos(\gamma_i)}{\cos(\gamma_i) \text{ for } \chi = 0}$$

$$f_i = \frac{\cos\left(\arctan\left(\tan(\chi) + \tan\left(\frac{\alpha_i}{2}\right) * K - 2 * \tan\left(\frac{\alpha_i}{2}\right) * K * \frac{i}{n}\right)\right)}{\cos\left(\arctan\left(\tan\left(\frac{\alpha_i}{2}\right) * K - 2 * \tan\left(\frac{\alpha_i}{2}\right) * K * \frac{i}{n}\right)\right)}$$

3. The correction factor for the electronic correction of the line length is further determined according to the following:

$$R_i = f_i * c_i$$

to $$R_i = \frac{\cos\left(\arctan\left(\tan(\chi) + \tan\left(\frac{\alpha}{2}\right) * K - 2 * \tan\left(\frac{\alpha}{2}\right) * K * \frac{i}{n}\right)\right)}{\cos\left(\arctan\left(\tan\left(\frac{\alpha}{2}\right) * K - 2 * \tan\left(\frac{\alpha}{2}\right) * K * \frac{i}{n}\right)\right)}$$

From this, the line opening angle $\beta_x$ of every line can be calculated by:

$$\beta_i = R_i * \beta.$$

In the case of a line mirror, direct control of a tilting mirror is generally not possible with an angle deflection function at usual video frequencies if special tilting mirrors, for example, according to DE 195 47 584, are not used. At a constant angular deflection speed of the line mirror—a polygon mirror in the example shown in FIG. 1—the factor $R_i$ serves as a scaling variable for the above-described scaling of the line length $L_i$ in the transformation according to the method according to the invention $x_{ei}; x_{ai} \rightarrow x_{ad}; x_{id}$. The line deflection angle $\beta$ is a fixed value which is given by the geometry of the facets of the line mirror and, further, the time interval T for each line is determined by the rotating speed.

Adjustment of line length, i.e., the determination of the start of the line $x_{ad}$ and the end of the line $x_{ed}$, is carried out by the correlation of the brightness modulation and color modulation of the image points to the position of the facet surface of the polygon mirror (line mirror). A corresponding complete control circuit will be described hereinafter.

According to FIG. 12, the projection head 14 is inclined relative to the projection surface, for example, with a projection angle $\epsilon = -15°$. The projection angle $\epsilon$ is the angle between the projection axis corresponding to the optical axis OA of the deflection system and the normal, designated as vertical V, to the projection surface 101 as can also be seen from FIG. 6. The reference point of the angle is the origin of the beam deflection, i.e., in this system with angle-magnifying projection optics 13, the exit pupil AP of the magnification optics 13.

The angle limits are 0°—no inclination—and +/−90°, wherein a negative angle means that the projection head 14 is inclined toward the start of the line. Accordingly, a positive angle means that the projection head 14 is inclined toward the end of the line. For this determination, it was further assumed that the projection surface is a rear projection surface and that the lines are written from left to right as seen by the observer.

The magnification optics 13 and the line mirror 11 are arranged relative to one another in such a way that the entrance pupil EP of the projection optics lies in the origin of the beam deflection in the vicinity of the line mirror 11. Let the start of the line be defined such that the lines are written from left to right as seen by the viewer, which corresponds to the usual television standards.

Further variables which are shown in FIG. 12 and/or used in the following formulas are indicated as follows:

Values $\beta_{yi}$ are deflection angles of the line mirror for every image point y of a line i with reference to the projection axis OA of the deflection system 17 and the deflection point of the line mirror for the respective line i;

Value g designates the distance on the projection surface between the projection axis and the vertical V to the exit pupil on the projection surface;

Values $a_{yi}$ are projection spacings of every image point of every line i measured from the exit pupil AP to the respective line center;

Values $t_i$ are the respective spacings of the first image point from the vertical to the exit pupil on the projection surface;

Values $t_{yi}$ are the respective spacings of the image points y of every line i from the vertical to the exit pupil on the projection surface;

Angles $\zeta_{yi}$ are the projection angles between the straight lines |image points y in the line i–exit pupil AP| to the vertical V;

Angles $\xi_{yi}$ are the projection angles between the straight lines |image points y in the line i–exit pupil AP| and the optical axis OA behind the deflection system 14;

in this respect, designates the quantity of image points p=m+1 within a line and y is an index, where y=(0, 1, . . . , m) and m=p−1.

C. Correction of the image point spacings (deflection angle function of the line mirror $\beta_{yi}$) due to the tangent error in the line direction and in a diagonal projection due to an inclination χ and/or an inclination ε. This calculation must be carried out for every line i=(0, 1, 2, . . . , n).

1. Determination of the distance of the first image point t (first image point lies at the start of the line) from the vertical V, where $b_i/2 = \tan(\beta_i/2)*K$ and $g = \tan(\varepsilon)$ becomes $t_i = \tan(\varepsilon) + \tan(\beta_i/2)*K$ The same distances of the additional image points are calculated proceeding from this distance $t_i$, resulting at the end of this calculation in various magnitudes of deflection angle $b_{yi}$ of the line mirror 11 per image point y in every line i.

2. Distances of the image points y=(0, 1, 2, . . . , m) from the vertical V through the exit pupil on the projection surface:

$t_{yi} t_i − b_i*y/m$ $t_{yi} = \tan(\varepsilon) + \tan(\beta_i/2)*K − 2*\tan(\beta_i/2)*K*y/m$, where y/m is the resolution in the line direction (quantity of image points p=m+1)

b is the image width at distance a=1.

3. Projection angle $\zeta_{yi}$ between the straight lines image point y=(0, 1, 2, . . . m)–exit pupil AP| to the vertical V on the projection surface calculated from the image point spacing $t_{yi}$ of every image point y in every line i:

$\zeta_{yi} = \arctan(t_{yi})$ $\zeta_{yi} = \arctan(\tan(\varepsilon) + \tan(\beta_i/2)*K − 2*\tan(\beta_i/2)*K*y/m)$ 4. Projection angle $\xi_{yi}$ between the straight lines image point y–exit pupil AP| with reference to the optical axis OA of the deflection system 14:

$\xi_{yi} = \zeta_{yi} − \varepsilon$ $\xi_{yi} \arctan(\tan(\varepsilon) + \tan(\beta_i/2)*K − 2*\tan(\beta_i/2)*K*y/m) − \varepsilon$ 5. Projection angle $\beta_{yi}$ for every image point y of every line i with reference to the optical axis OA of the projection head 14 and the deflection point of the line mirror 11:

$$\beta_{yi} = \arctan\frac{\tan(\xi_{yi})}{K}$$

$$\beta_{yi} = \arctan\frac{\tan\left(\arctan\left(\tan(\varepsilon) + \tan\left(\frac{\beta_i}{2}\right)*K − 2*\tan\left(\frac{\beta_i}{2}\right)*K*\frac{y}{m}\right) − \varepsilon\right)}{K}.$$

This function $\beta_{yi} = f(i, y, \varepsilon, \chi, K)$ (see the graphs in FIGS. 18 and 19) is directly impressed on a control voltage of the line mirror when using a deflection device whose deflection angle position can be adjusted within a line by an electrical magnitude with sufficiently high dynamics.

When using a polygon mirror as a line mirror 11 with the usual requirements of standards for video images, the image point spacing can also be adjusted by temporal modulation of the image point frequency as was already described above.

D. Correction of the image content resulting from a diagonal ε of the projection axis of the deflection unit on the projection surface (inclination χ is 0° in this case) or resulting from an inclination χ and a diagonal ε.

All brightness values and color values of an image point must be correlated with the angular positions of the deflection system which, in the present example, correspond to a rectangle (image area 103) that is completely covered by the area that is actually scanned by the deflection device (line mirror and frame mirror). In this respect, the line spacings of an image, the line lengths, and the image point spacings within the lines are initially optimized for the respective projection ratios according to the calculations in A, B and/or C and new video information is calculated for this geometrically optimized image point scanning in the line direction and in the frame direction for every image point that can now be displayed from the existing RGB video data.

Methods for preparing a video image, especially for increasing resolution, are known, for example, from DE 19517 357 C1.

The method described herein is to be applied in a corresponding manner for reducing image distortions on a curved projection surface corresponding to FIGS. 7 and 8. However, it is assumed that the distorting effect of the projection surface is known and is also incorporated into the video information as a data set or record or is supplied to the electronics of the projection device.

The transformation from distorted image to distortion-corrected image can be carried out by means of a ROM or RAM as was already shown with reference to FIG. 9. The storage values of the ROM or RAM are calculated according to the above equations.

Figure 4:
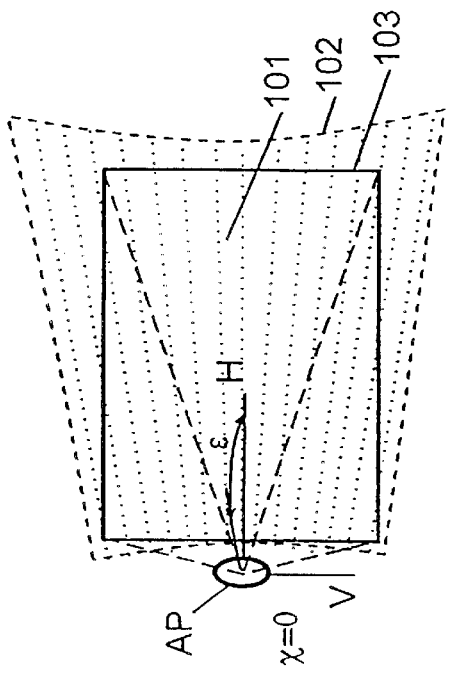
FIG. 4 shows a schematic view corresponding to FIG. 3, but with geometric errors in two directions.

In FIG. 4, the exit pupil AP is offset relative to the image center horizontally by angle $\chi$ as well as vertically by angle $\epsilon$. The border indicated by a dashed line shows the distortion of an uncorrected image 102.

The solid border shows the distortion of an uncorrected image 102.

The solid border shows the area in which image points are intensity-modulated and color-modulated and are displayed by the deflection device and an extensively undistorted image 103 is generated.

The dotted lines in this case show the course of the scanned lines, and it can be seen that a simple line spacing correction according to A, a scaling of the line length according to B and an image point distance correction according to C are not sufficient.

In this case, for displaying an undistorted image, it is advisable that the video information (brightness and color) of every image point is recalculated by the calculation according to D in such a way that the position of geometrically optimally corrected image points to be displayed is determined within the respective lines in accordance with location.

FIG. 7 shows the conditions in the example of a front projection on a concave projection screen 101, for example, the backscattering envelope of a balloon. The projector 100 normally delivers a distorted image 102. In principle, display of images is possible up to a limiting angle that is formed by the tangents contacting a curved surface proceeding from the center of projection. Because the angle of the light beams impinging on the projection screen decreases proceeding from the center of projection, the distortion of the image increases with increasing distance from the center of projection. This distortion can be counteracted by a correction of the line spacings and recalculation of the scanned image points of the undistorted image 103 while taking into account the distorting effect of the projection surface according to the calculation indicated in A, B, C and D.

The methods described in detail hereinafter can be carried out for the different corrections with respect to the surfaces mentioned above by way of example for correction of distortion.

In FIG. 3, the exit pupil AP is offset horizontally by angle $\chi$ relative to the center of the image to be displayed. The border shown by dashed lines shows the distortion of an uncorrected image 102.

The solid border shows the area in which image points are intensity-modulated and color-modulated and displayed by the deflection device and in which an extensively undistorted image 103 is generated. For the image calculation for purposes of distortion correction, the calculations according to A, B, C and D are carried out, wherein $\epsilon=0°$ and $\chi=0°$ in the equations.

In FIG. 6, the exit pupil AP is offset vertically by angle $\epsilon$ relative to the center of the image. The border shown by dashed lines shows the distortion of an uncorrected image 102.

The solid border shows the area in which image points are intensity-modulated and color-modulated and displayed by the deflection device and in which an extensively undistorted image 103 is generated.

The dotted lines in this case show the configuration of the scanned lines and it can be seen that a simple line spacing correction according to A, a scaling of the line length according to B and an image point spacing correction according to C are not sufficient.

In this case, for a low-distortion image display according to step D, the video information (brightness and color) of every image point must be recalculated and correlated with the geometrically optimally corrected image points within the respective lines.

However, a new calculation of the image according to step D can be avoided in this case (FIG. 6) so as to reduce expenditure by following the steps prescribed in E below.

However, a limit is given in that the collinear light beam having a round cross section, per se, becomes ovoid as the projection angle increases and the different image points accordingly merge with one another, and in that the reflection and scattering ratios at an angle are no longer adequate for image reproduction.

FIG. 8 shows the conditions for the example of front projection on a convex projection screen 101, for example, the scattering inner surface of a dome such as is used in a planetarium.

When scanning the image points in Cartesian coordinates, the projector 100 delivers a distorted image 102. Previously, undistorted images could be displayed only when the projector stood in the center point of a convex projection surface and is scanned in polar coordinates.

In all other cases, an image distortion occurs. This distortion can be counteracted by a correction of the line spacings and recalculation of the scanned image points of the undistorted image 103 while taking into account the distorting effect of the projection surface according to the equations given in A, B, C and D.

By way of addition to the correction possibilities mentioned above, it is possible in principle to rotate the image information electronically by 90° with the result that the projector arrangement shown in FIG. 2 displays an image that is rotated by 90° and the line mirror (polygon mirror) realizes the image height and the frame mirror (tilting mirror) realizes the image width.

Figure 13:
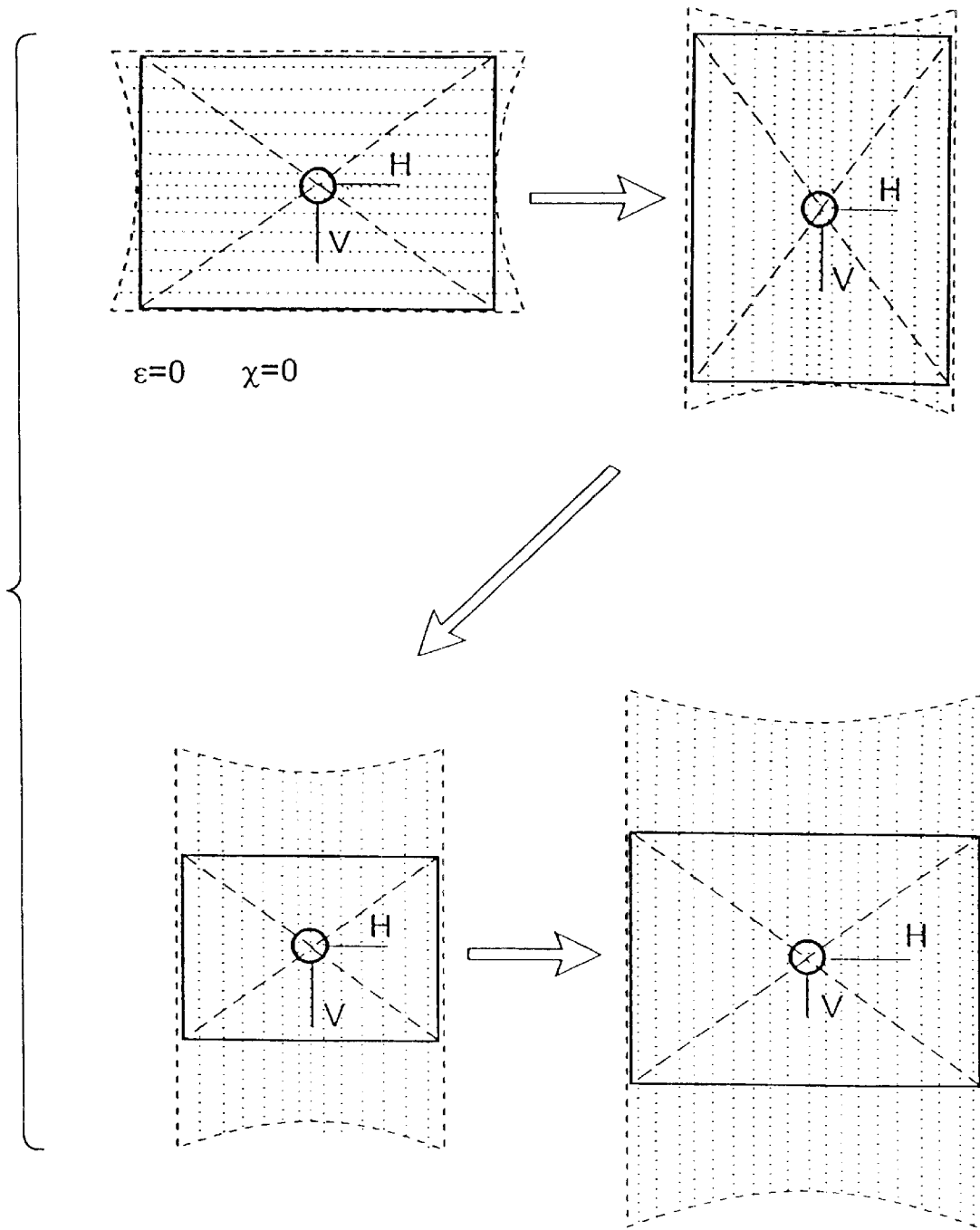
FIG. 13 is a schematic view for explaining a method step for the rotation of the image scanning device in direct or straight-line projection.

Step E, which was mentioned above, will be described in the following:

E: Rotation of the image by 90°, rotation of the deflection device of the projector by 90°, and application of the calculations according to A, B and C based on the method according to FIG. 3 with the proviso that $\chi$ is replaced by $\epsilon'$ and $\epsilon$ is replaced by $\chi'$ in the formulas, where $\epsilon'\neq0°$ and $\chi'=0°$. This alternative correction possibility is shown in detail with reference to FIG. 13.

First, an image scanned in lines is displayed, wherein the lines extend in the horizontal direction. After rotating the deflection device by 90°, the lines extend in the vertical direction.

Figure 14:
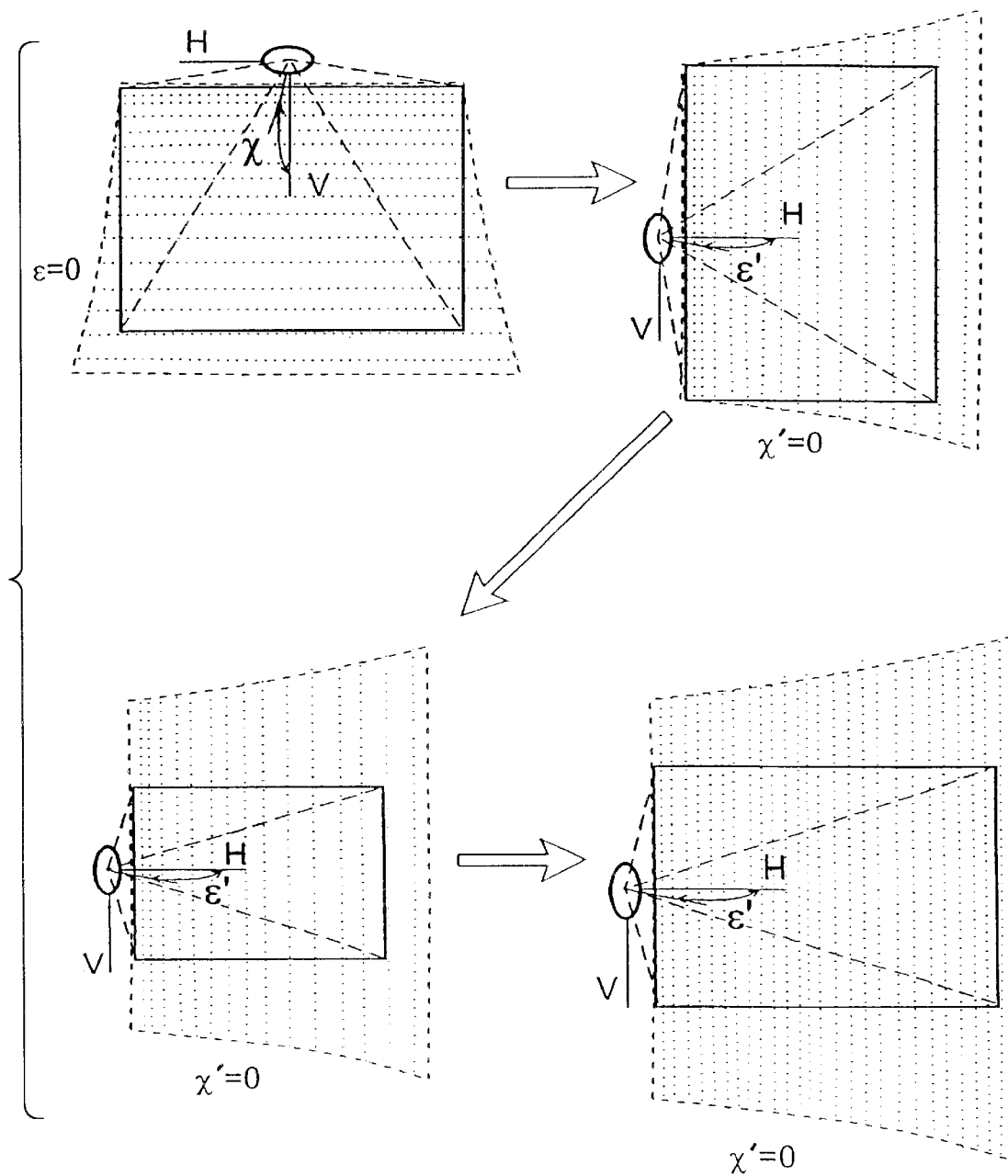
FIG. 14 is a schematic view for explaining a method step for the rotation of the image scanning device in diagonal projection.

The image is subsequently also rotated by 90° and the image is the right way around again, but the image width only corresponds to the original image height. By adapting the number of lines to the number of image points of a line and adapting the image size by means of varifocal optics, the original image is obtained, but with the difference that the information which was originally scanned in the line deflection direction is now scanned in the frame deflection direction, and vice versa. This procedure is particularly advantageous for a projection device which is inclined at an angle of $\epsilon\neq0$ to the projection screen as is shown by way of example in FIG. 14. Accordingly, a diagonal projection with an inclination according to FIG. 6 is to be reduced to a diagonal projection with an inclination according to FIG. 3.

In order to carry out rotations of the kind mentioned above, the image point information is stored linewise, for example, in a RAM and read out columnwise vertical to the line direction, or vice versa. The storage location in the RAM should then be dimensioned such that the information for the image points to be blanked in the respective time intervals for lengths ($x_{ai}$; $x_{ad}$) and ($x_{ed}$; $x_{ei}$) can also be stored in the RAM. In this type of storage, it is also no longer necessary to use special electronics for blanking because dark values are stored for the image points for writing the intervals ($x_{ai}$; $x_{ad}$) and ($x_{ed}$; $x_{ei}$). The storage information is then simply read out sequentially.

FIG. 15 shows a control circuit for generating a deflection angle function for a tilting mirror such as that used as frame mirror 12 in the embodiment example in FIG. 1. The calculated deflection angle function $\alpha_i$ is then the controlling variable.

By means of a function controller 72, the angle values $\alpha_i$ for generating the control voltage $U_G$ for the frame mirror are read out of the function storage 71 and delivered to a d/a converter 73.

The generation of the deflection function for the frame mirror is synchronized and clocked by means of a clock generator and synchronizing signal generator. The object of the microcontroller 75 consists in the basic initialization and programming of the programmable function generator 70 and preparation and loading of the corrected deflection function in the function storage 71 via the data controller 74. A change in the parameters or deflection function for the programmable function generator can be carried out by means of the I²C bus of an overriding device.

Figure 16:
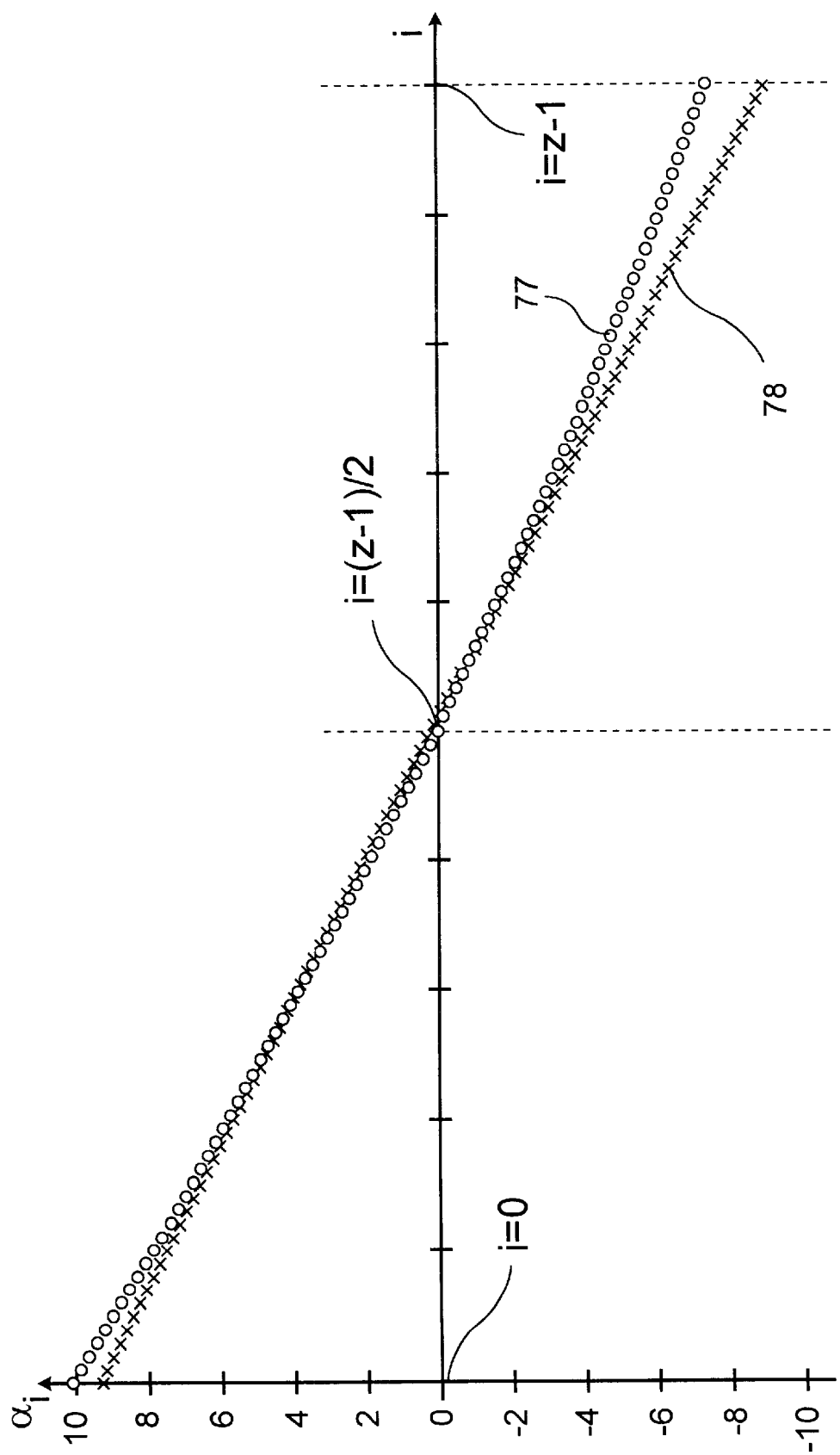
FIG. 16 is a graph showing the dependence of the deflection angle $\alpha_i$ of a frame mirror for different lines i.

FIG. 16 shows the curve of the vertical opening angle $\alpha_i$ as a function of the line spacing i for an arrangement 100. The calculations are carried out according to the equations developed in A.

A curve 78 shows the course for an arrangement 100 for displaying an image according to FIG. 5 in which the projection inclinations are $\chi=0°$ and $\epsilon=0°$. For this purpose, exclusively the tangent error in the frame direction is corrected, so that this function is only approximately a straight line.

Another curve 77 shows the corresponding correction for a projection according to FIG. 3, in which the projection inclinations are $\chi=-15°$ and $\epsilon=0°$. With a deflection angle function of this kind, the lines of an image are written at equal line spacings in a diagonal projection of $-15°$.

Figure 17:
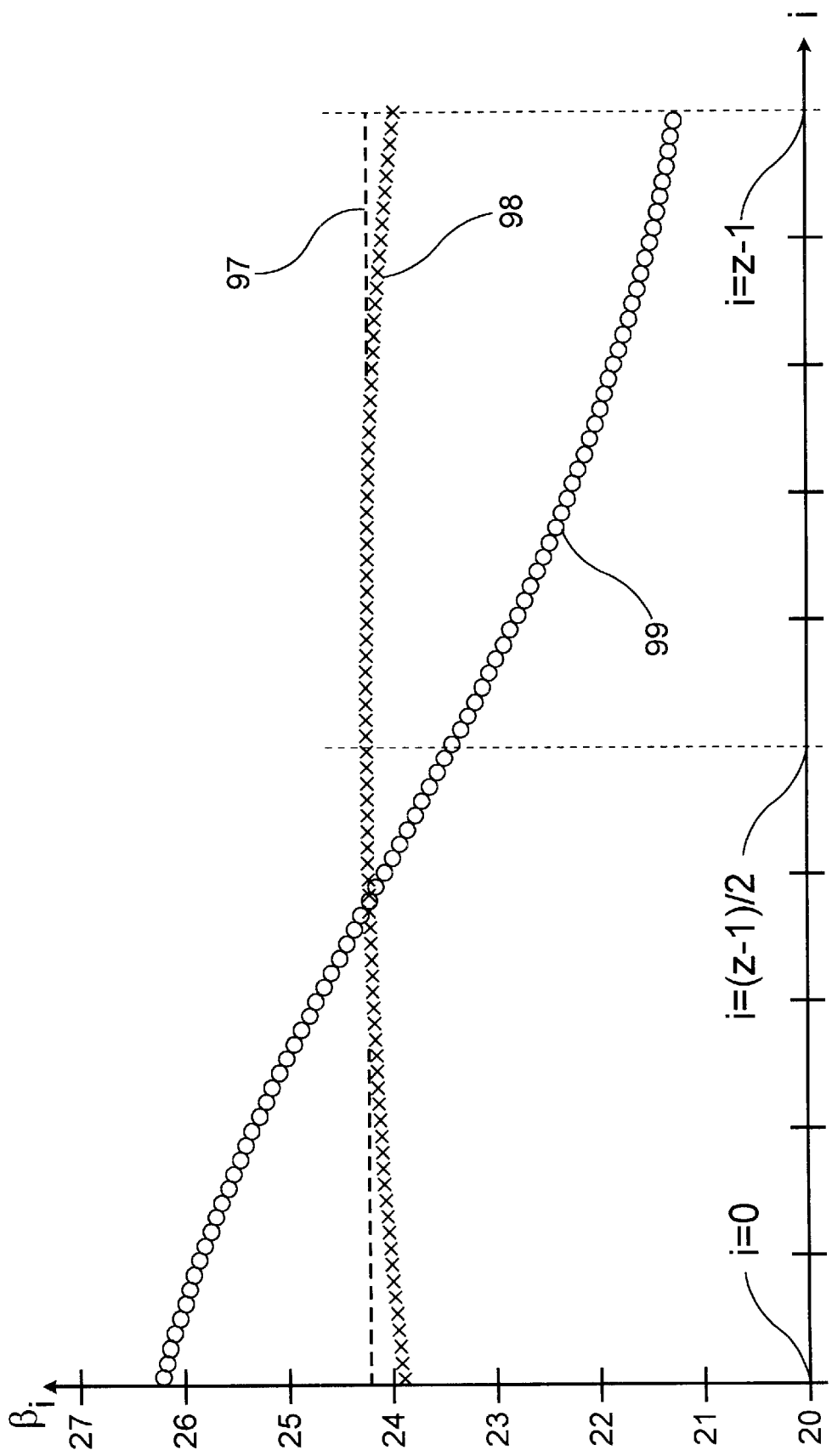
FIG. 17 is a graph showing the deflection angle of a line mirror as a function of the line i for line length correction.

FIG. 17 shows the scaling of the deflection angle $\beta_i$ of the line mirror in a projection system as a function of the quantity of lines i. The calculations are carried out according to the equations in B which also show the time progression for the display of the individual image points.

A first curve 97 shows this dependency as a straight line for a projection without correction of the pincushion distortion in which the projection inclinations are $\chi=0°$ and $\epsilon=0°$.

A second curve 98 shows the above-mentioned dependency for projection with correction of the pincushion distortion according to the bold line 103 in FIG. 5, in which the projection inclinations are $\chi=0°$ and $\epsilon=0°$.

Another curve 99 shows the above-mentioned dependency for a projection according to FIG. 3, in which the projection inclinations are $\chi=-15°$ and $\epsilon=0°$. With a deflection angle function of this kind, all of the lines of an image are written with equal line length in a diagonal projection of $\chi=-15°$.

Figure 18:
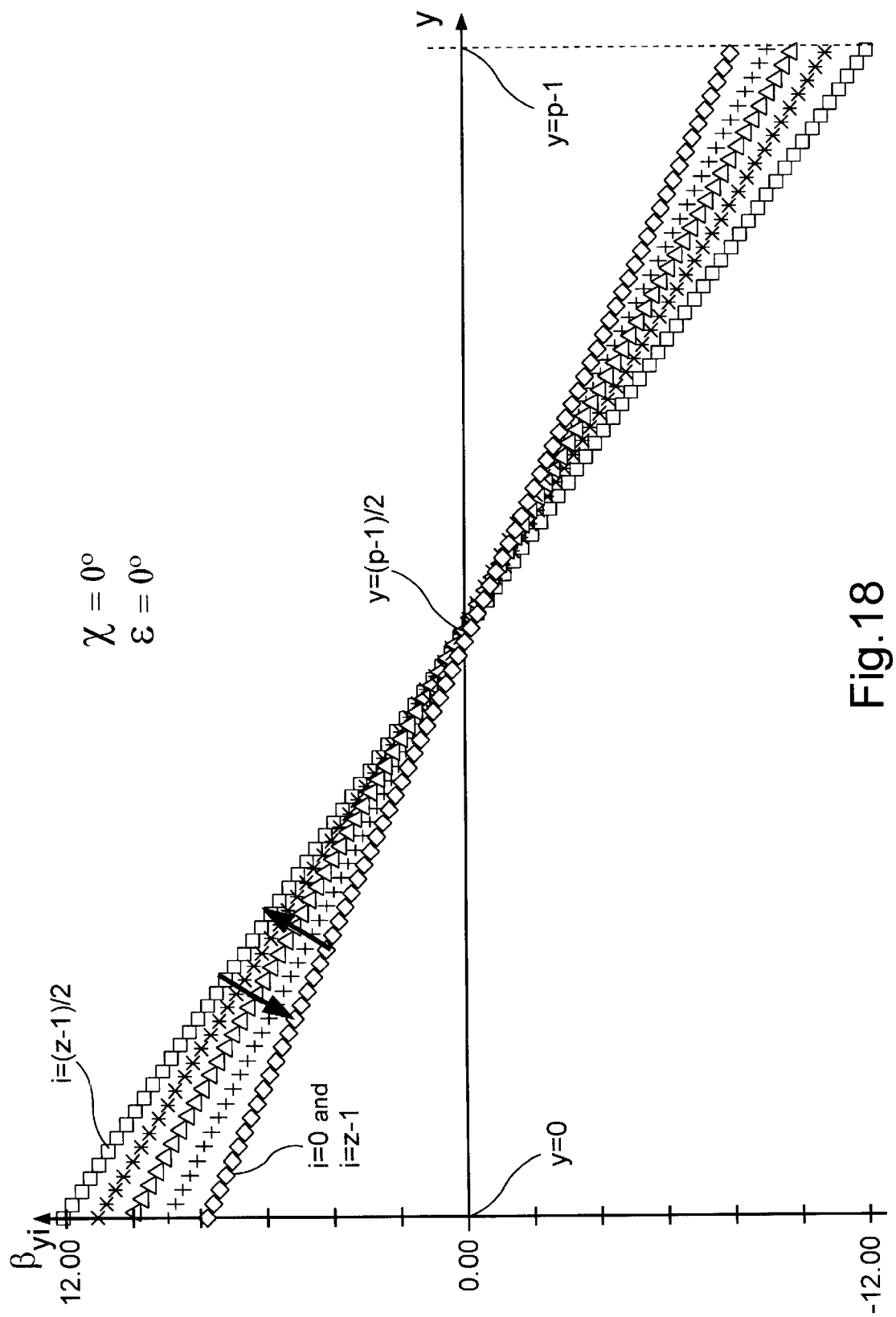
FIG. 18 is a graph showing the deflection angle of a line mirror as a function of the number of image points y and the number of lines i as parameters in projection from the image center.

FIG. 18 shows the deflection angle function $\beta_{yi}=f(i, y, \epsilon, \chi, K)$ of the line mirror as a function of the image point coordinates, where $\epsilon=0$ and $\chi=0$. The calculation for this is carried out according to the equations in C.

The parameter for the family of curves is the line number i. The values $\beta_{yi}$ give $\beta_i/2$ for y=0 and y=p-1.

The shape of the curves deviates from a straight line. This is due to the fact that an error of the image point spacings which occurs in a projection $\epsilon=0$ and $\chi=0$ due to the tangent error in the line direction is corrected.

The curve $i=(z-1)/2$ corresponds to the image center, curve i=0 corresponds to curve i=z-1 for the start of the line and the end of the line, respectively.

Figure 19:
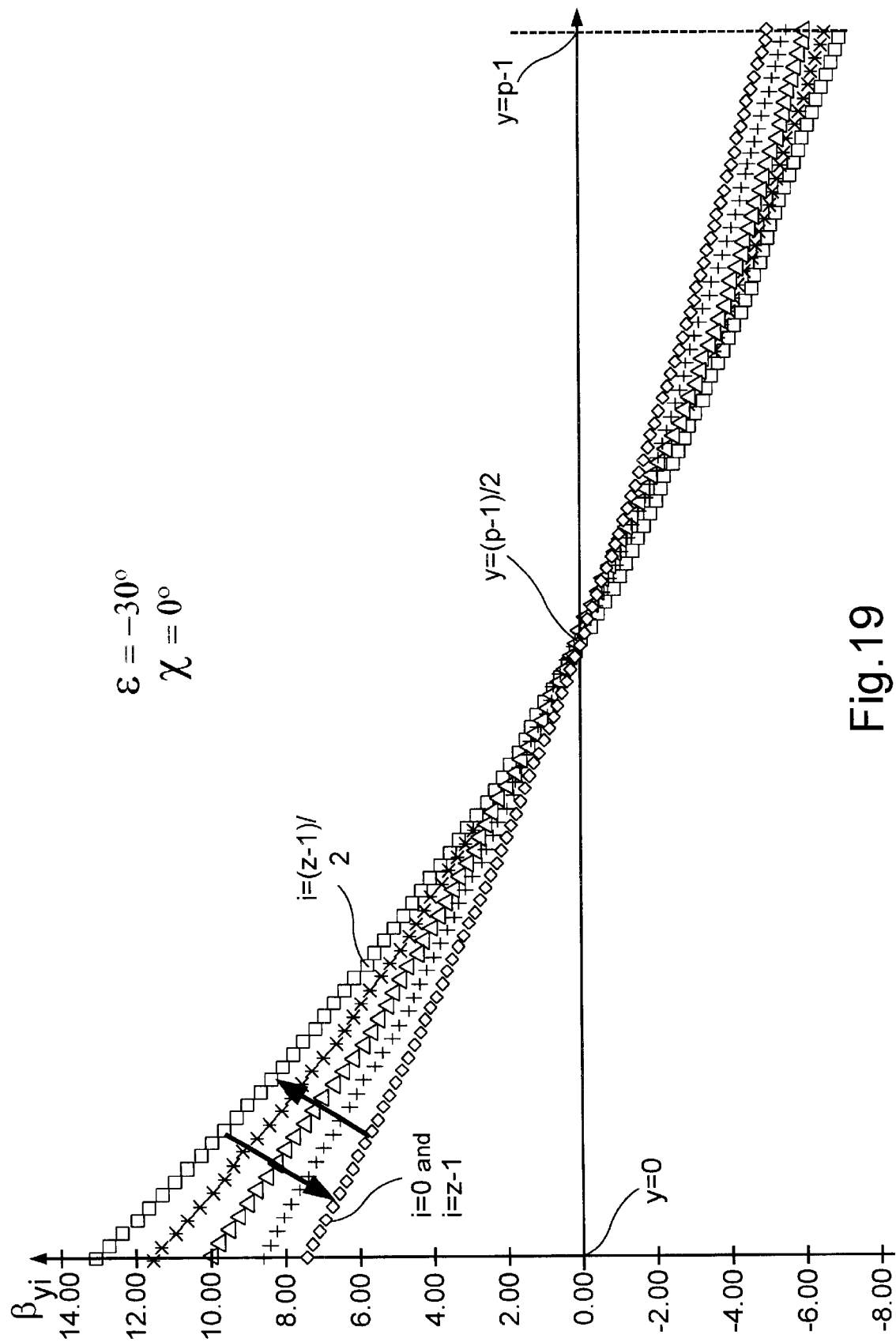
FIG. 19 is a graph corresponding to FIG. 18, but with projection at an angle $\epsilon$ other than zero.

FIG. 19 shows the deflection angle function $\beta_{yi}=f(i, y, \epsilon, \chi, K)$ for the line mirror according to the equations in C. The deflection angle $\beta_{yi}$ is also shown in this case as a function of the image point number y. The parameter for the family of curves is the line number i. The family of curves that is shown describes the course of the error of the image point spacings which occurs in a projection at a diagonal $\epsilon=-30°$ and when the tangent error occurs in the line direction.

The curve $i=(z-1)/2$ corresponds to the image center, curve i=0 corresponds to the position of the image points for the start of the line, and curve i=z-1 describes the correction of the image points for the end of the line. The bold arrows in FIGS. 18 and 19 show the scanning sequence.

Figure 20:
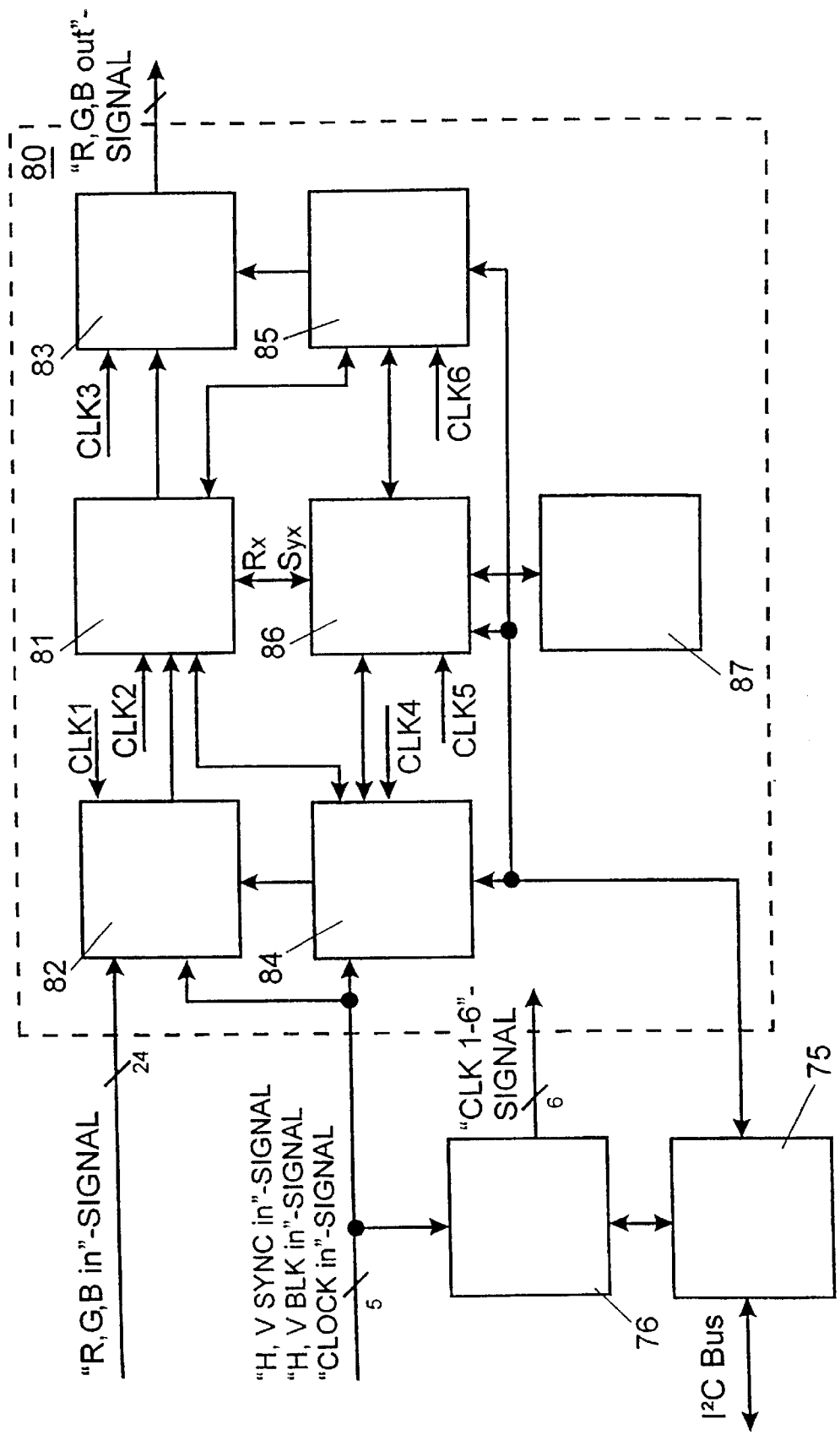
FIG. 20 is a circuit arrangement for scaling the image point information.

FIG. 20 shows a function block diagram of an electronic device for scaling 80 of real-time video data with the possibility of dynamic scaling in the line direction. The storage contents for the image points in lengths ($x_{ai}$–$x_{ad}$) and ($x_{ed}$–$x_{ai}$) are set to dark, so that the outgoing video signal ("R,G,B out") is already prepared according to the method according to the invention. As will be shown with reference to FIG. 21, a dynamic scaling in the vertical direction, i.e., in the frame direction, can also be carried out in a similar manner after a 90-degree rotation of the image.

The spatial and temporal distribution of the image points in a line and the video information of every image point are calculated in real time and related to the optimized scanning area of the line mirror 12 for the respective geometry of the image display. The deflection device delivers a synchronizing signal "DEF clock" for the output of the image point data (asynchronous control).

The video input data "R,G,B in", "H,V SYNC in", "H,V BLK in", "PCLK out" of the video source is delivered to the RGB scaler 81 via the buffer storage 82.

The synchronized transmission of the input video data stream "R,G,B in" into the scaler 81 is carried out in the example by means of the clock generator 76 and the input controller 84 controlled via a buffer storage 82. Input data for the scaler 81 in this case are the correction values $R_i$ which are related to the line opening angle $\beta_i$. The correction values $S_{yi}$ for the image point spacing are calculated from the deflection angle function $\beta_{yi}$ of the line mirror.

After scaling, the video data are transformed via the buffer storage 83 by means of the output controller 85 into an output data stream "R, G, B out" which is related to the scanned image points of a line and the lines of an image.

The buffer storage in this case is designated as FIFO (first in, first out). However, following a 90-degree rotation, an image storage for a total video image which, in this example, is operated like a FIFO is provided instead of a FIFO. But in order to carry out a 90-degree rotation, this image storage is read out columnwise when it has been described linewise, or vice versa.

The data and the program of the scaler 81 for dynamic scaling are supplied via the data controller 86 and the parameter RAM 87. This is carried out synchronously at the command of the scaler 81. The data controller 86 with parameter RAM 87 can also be constructed similar to the circuit in FIG. 9.

In the embodiment example, the only task of the microcontroller 75 is to carry out basic initialization and to program all electronic components corresponding to the respective requirements. Further, the microcontroller makes available the dynamic scaling parameters for the parameter RAM 87 via the data controller 86. Under fixed projection conditions, these values are read out from a ROM. At different angles $\epsilon$ and $\chi$, these angles can be inputted in an EEPROM. The microcontroller then reads these values for initialization and calculates the values for a RAM for scaling in accordance with the indicated equations.

The clock distribution and generation for all devices is carried out by means of the clock generator 76 in a manner familiar to those skilled in the art.

A change in parameters for the electronic device for horizontal scaling 80 can also be carried out via the I²C bus by the microcontroller 75 from an overriding device.

Figure 21:
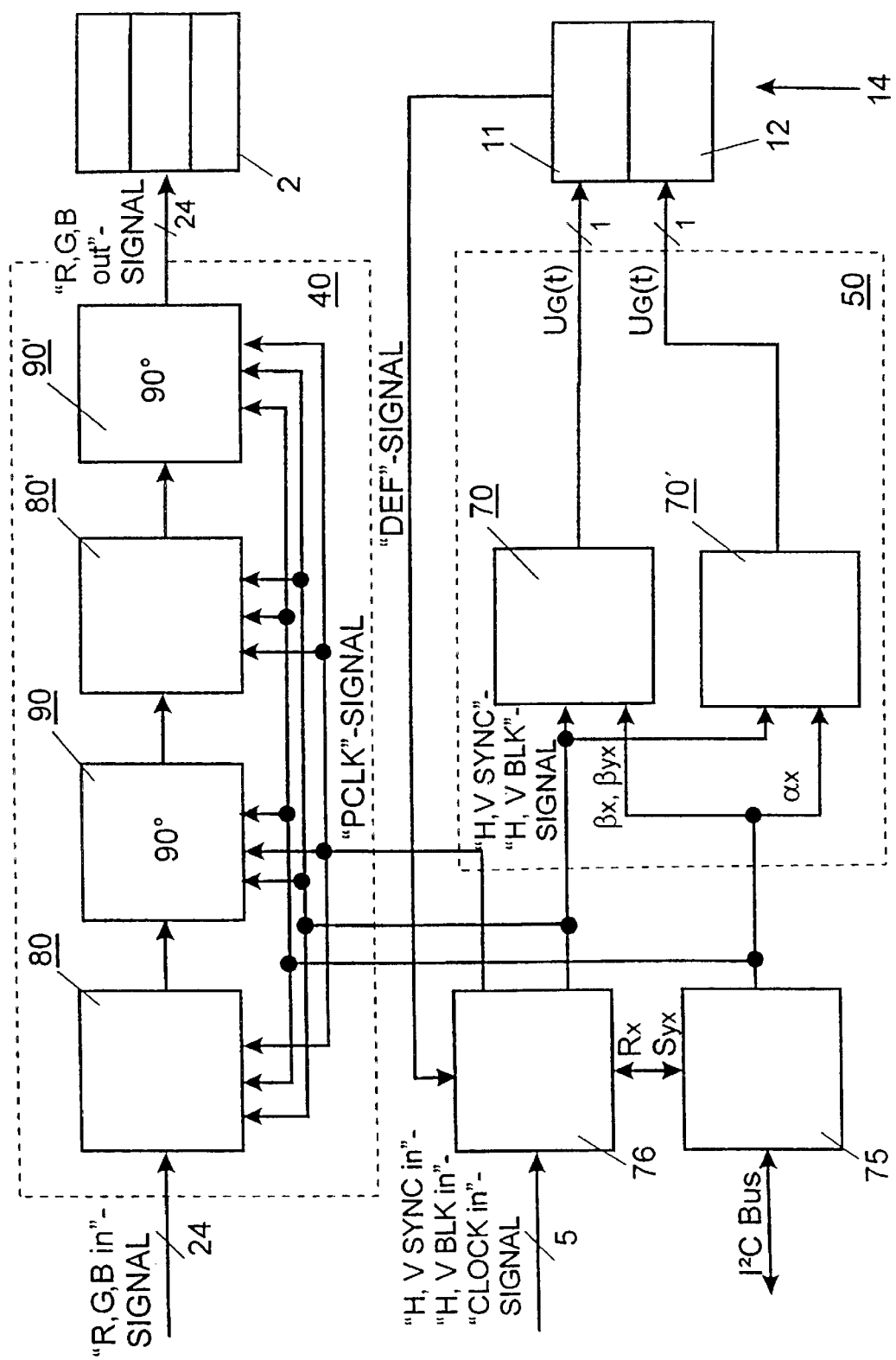
FIG. 21 is a circuit arrangement for optimization of the geometry of a deflection device with tilting mirror and recalculation of the image for correction of image distortion in real time.

FIG. 21 shows a block diagram for a circuit for correction of image errors in video projection with a writing light bundle in real time in which a recalculation of the image is also taken into account, wherein, above all, the functions shown in FIGS. 11, 12, 13 and 14 and the above-described computing methods are taken into account.

The circuit shown in FIG. 21 enables comprehensive real-time correction of image errors such as those which can occur, for example, when projecting video images on any curved surfaces and/or at any projection angles.

It can be seen from FIG. 21 that image errors caused by the projection process and projection surface can be corrected completely, and even in real time, with a comparatively minor additional expenditure on electronic components and software, wherein the read-out image is delayed relative to the incoming video image by two video frames because of the two-fold 90-degree rotation carried out.

Initially, a dynamic scaling of the image points in the line direction (i-direction) and, after a 90-degree rotation of the image in a device for image rotation 90, a scaling of the image points in the frame direction (y-direction) is realized in a device 80' by means of the device for dynamic scaling 80. Another 90-degree rotation is then carried out by means of another device for image rotation 90'. These devices 80, 80' form the basis for the calculation of full frames in real time.

The video data "R,G,B out" are then supplied to the modulators 2 of the light source 10 which can be brightness-modulated and color-modulated, wherein the time sequence of the image points is controlled by the signal PCLK generated by the signal "DEF clock". The time sequence for line deflection and frame deflection is controlled by the signals $U_G(t)$.

Each device 80 and 80' is essentially a circuit according to FIG. 20, wherein the component groups, clock generator 76 and microprocessor 74, needed for the control are realized only once for the entire system.

The line length is adjusted in the device for dynamic scaling 80 in the line direction via the signal "H BLK", whose signal waveform is influenced by the values $R_i$ ($\beta_i$) which are also contained, per se, in the angle deflection function $\beta_{yi}$ ($S_{yi}$).

The image height is adjusted in the device for dynamic scaling 80' in the frame direction via the signal "V BLK" whose signal waveform is influenced by the values of the deflection angle $a_i$.

The programmable control circuits 70 and 70' substantially correspond to the circuit according to FIG. 15 and realize the corrections of image errors which can be corrected by means of the frame mirror and line mirror. The control circuits 70 and 70' together form the control circuit 17, shown in FIG. 1, for image point scanning and line scanning, wherein, however, the deflection device must be carried out sufficiently quickly in both directions by a control signal. Miniaturized tilting mirrors or acoustooptical deflectors, for example, are suitable for fast deflections.

An optimized scanning geometry is produced in the control circuit for image point scanning and line scanning 17 by means of the circuit arrangement shown in FIG. 21 and the associated deflection system, while a new image with optimized resolution is calculated for the optimized scanning geometry in the device for image calculation 17 based on the incoming video information.

The device 17 can be further simplified when the last 90-degree rotation is not carried out electronically, but rather by rotating the image, i.e., changing the scanning direction by rotating the deflection mirror.

Figure 22:
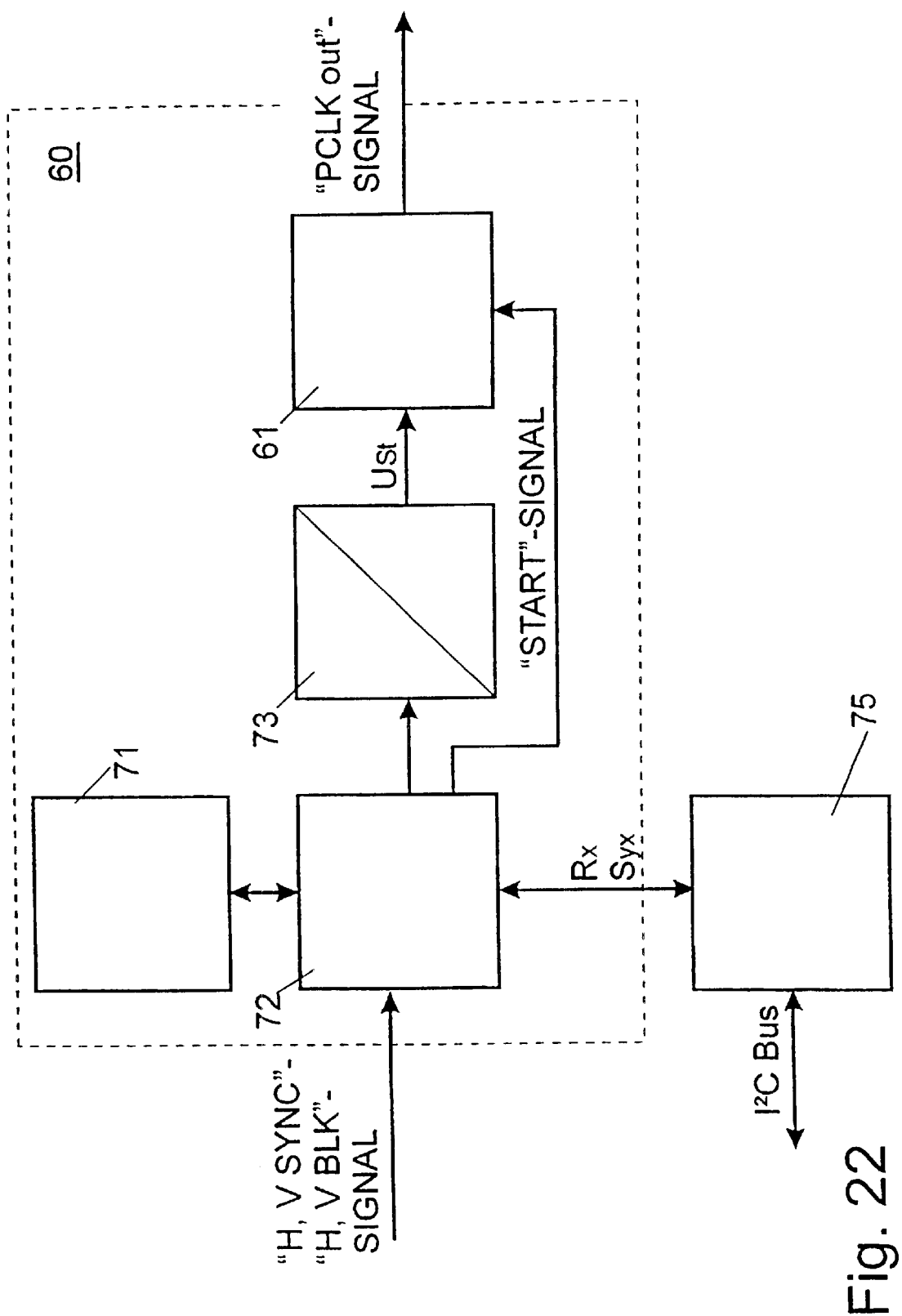
FIG. 22 is another circuit arrangement for scaling image point spacings.

FIG. 22 further shows a programmable modulation circuit 60 with a voltage-controlled oscillator 61 for a suitable frequency modulation of the signal PCLK. The programmable modulation circuit 60 achieves a correction of image errors by means of controlling the modulation of the image points within every line. In particular, the following errors can be corrected:

tangent errors in the line direction course of image point spacings due to diagonal projection course of image point spacings due to a curved projection surface For correction of these errors, a voltage proportional to the correction factor $S_{yi}$ is generated, by which the voltage-controlled oscillator (VCO) 61 is driven. A frequency modulation of the PCLK signal "PCLK out" is carried out in dependence on the applied voltage $U_{St}$. The voltage-controlled oscillator 61 can be synchronized at the start of every line by the START signal. For this purpose, the microcomputer 75 generates the voltage proportional to the values of the correction factors $S_{yi}$. These are stored in an intermediate function storage 71 and supplied to the voltage-controlled oscillator 61 upon demand via a controlling and synchronizing circuit 72 and a subsequent d/a-converter 73.

Figure 23:
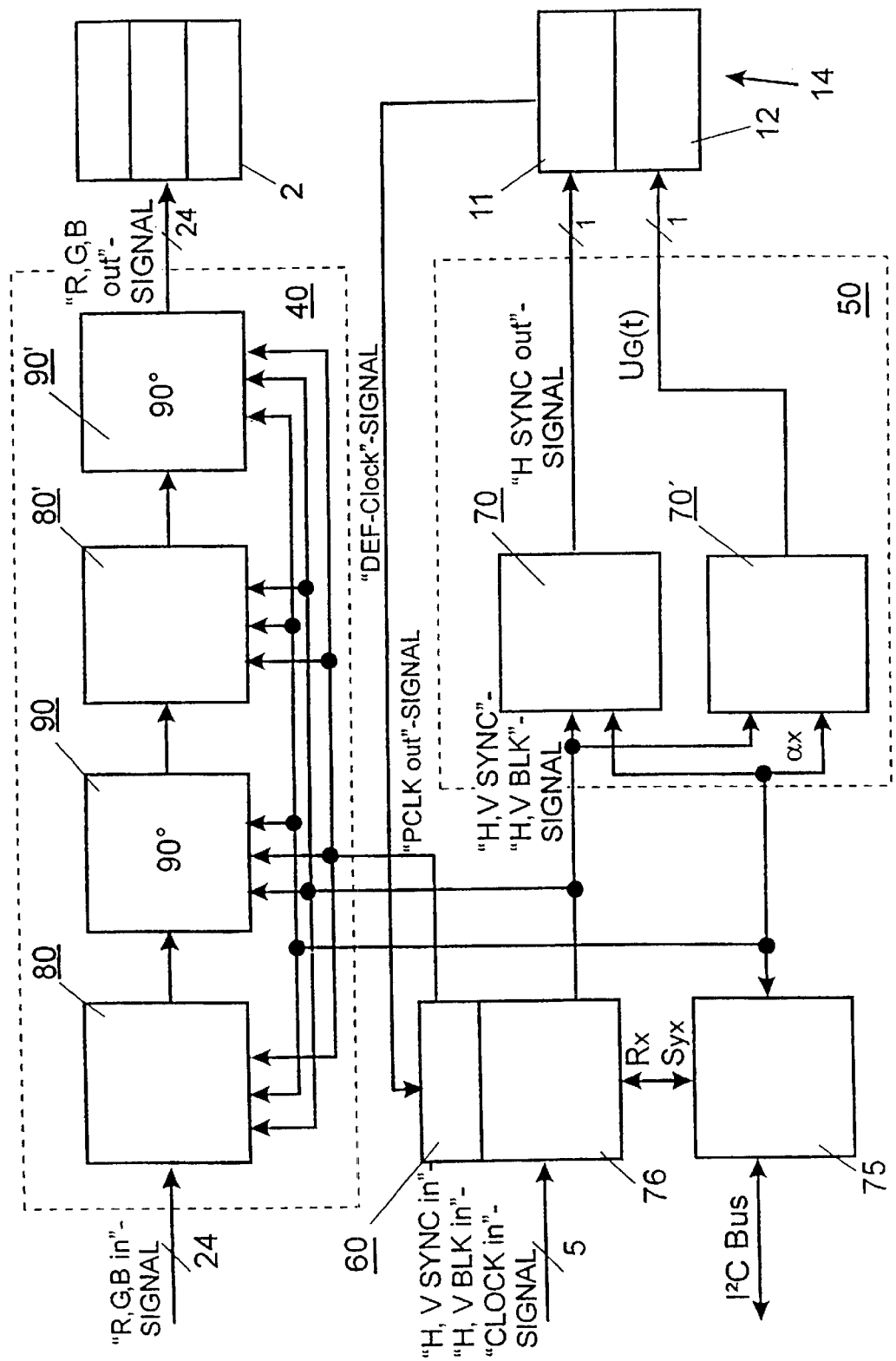
FIG. 23 is a circuit arrangement for optimization of geometry with distortion correction of the image point spacings and real-time image calculation.

FIG. 23 essentially corresponds to a circuit arrangement such as that described in FIG. 21, but with the circuit of FIG. 22. The frame mirror 12, a tilting mirror, is also driven by voltage $U_G(t)$ in this case.

The voltage-controlled oscillator 60 used in the example of FIG. 23 is advisably provided in the clock generator 76. The readout of the image points is controlled with respect to time by means of this circuit by the signal "PCLK out" generated by means of the signal "DEF-Clock", and the correlation of the image points with the respective position of the facets of the line mirror, in this case a polygon mirror, is determined in this way.

The modulation of the image points is time-compressed or delayed because of the controlling, so that the image points are written sequentially with corrected spacings in spite of the constant deflection speed of the line mirror.

An optimized scanning geometry is generated by means of this circuit arrangement shown in FIG. 23 and the associated deflection system 11, 12 only for the frame deflection (frame mirror 12) in the control circuit for image point scanning and line scanning 17. The line deflection (line mirror 11) is controlled by a constant signal "H SYNC out". In this case, the geometric optimization of the line is carried out in the microcomputer 75 which makes the correction values $S_{yi}$ available to the voltage-controlled oscillator 60. The correction values $R_i$ control the effective line length by way of the scaler 80.

In the device for image calculation 17, a new image with optimized resolution is calculated for the optimized scanning geometry proceeding from the incoming video information, and the "R,G,B out" data are read out in a sequence which is determined with respect to time by the image point spacings.

While the foregoing description and drawings represent the present invention, it will be obvious to those skilled in the art that various changes may be made therein without departing from the true spirit and scope of the present invention.

What is claimed is:

1. A method for the compensation of geometric image errors in video images with plurality of, at least i, lines, each line having a plurality of image points, wherein the image errors to be compensated influence the length of the lines and the ith line in geometric image errors that have not been compensated begins at a location $x_{ai}$ and ends at a location $x_{ei}$ on a projection surface, comprising the steps of:

deflecting a substantially parallel light bundle on the projection surface in two dimensions for sequential illumination of the image points of the video image;

intensity modulating said light bundle for the image point at every location on which the light bundle is deflected at this location in accordance with the image point information of the undistorted video image;

defining a value determining the start of the line of the compensated image by $x_{ad} \geq \text{Max}(x_{ai})$ and defining a value determining the end of the line of the compensated image by $x_{ed} \leq \text{Min}(x_{ei})$, where $x_{ed} > x_{ad}$; and deflecting the light bundle for the respective line deflected so that all image points of the line i are displayed sequentially within the area $[x_{ad}; x_{ed}]$ on the projection surface;

wherein the light bundle is scanned framewise diverging from a constant angle deflection with a function on the basis of which the line spacings of adjacent lines in the total image differ from one another by a maximum of 30%.

2. The method according to claim 1, in which T is the deflection time for every line i, wherein line information determined for the intensity modulation of the light bundle is stored sequentially in a storage as N image points and the light bundle is blanked at the start of each line i during a time interval for scanning the length $(x_{ad}-x_{ai})$, whereupon the information determined for intensity modulation for the N image points is read out of the storage within a time interval for scanning length $(x_{ed}-x_{ad})$ and the light bundle is intensity-modulated within this time interval with respect to this read-out information, and, at the conclusion of the sequential illumination of the N image points on the projection surface, the light bundle is blanked for the remainder of the time interval T for the scanning of each line.

3. The method according to claim 1, wherein the intensity of the light bundle for every image point is controlled in inverse proportion to its illumination time.

4. The method according to claim 3, wherein the proportional controlling is carried out after the readout of information from the storage.

5. The method according to claim 1, wherein the light bundle is scanned framewise diverging from a constant angle deflection with a function on the basis of which the line spacings of adjacent lines in the total image differ from one another by a maximum of 10%.

6. The method according to claim 1, wherein the light bundle is scanned linewise by a function in which the video information $V_i(x)$ of the line i for the image information at every location differs with respect to video information $V_{iT}(x)$ of an undistorted image by a maximum amount $$|V_{iT}(x) - V_i(x)| = \left| \frac{\partial V_i}{\partial x} \Delta x_i \right|,$$

where the value $\Delta x_i$ determined by this equation is less than 0.3-times the line length, especially less than 0.1-times the line length, divided by the number of image points according to the video standard of the video image.

7. The method according to claim 1, wherein before displaying the video image the image is calculated anew with respect to the deflections and the spatial correlation of the image points for displaying an undistorted image.

8. An arrangement for displaying video images on a projection surface in which image points in more than i lines are sequentially illuminated and geometric image errors are compensated in accordance with a method for the compensation of geometric image errors in video images with a plurality of, at least i, lines, each line having a plurality of image points, wherein the image errors to be compensated influence the length of the lines and the ith line in geometric image errors that have not been compensated begins at a location $x_{ai}$ and ends at location $x_{ei}$ on a projection surface, said method comprising the steps of:

deflecting a substantially parallel light bundle on the projection surface in two dimensions for sequential illumination of the image points of the video image;

intensity modulating said light bundle for the image point at every location on which the light bundle is deflected at this location in accordance with the image point information of the undistorted video image;

defining a value determining the start of the line of the compensated image by $x_{ad} \geq \text{Max}(x_{ai})$ and defining a value determining the end of the line of the compensated image is defined by $x_{ed} \leq \text{Min}(x_{ei})$, where $x_{ed} > x_{ad}$; and deflecting the light bundle for the respective line deflected so that all image points of the line i are displayed sequentially within the area $[x_{ad}; x_{ed}]$ on the projection surface, wherein these image errors to be compensated influence the length of the lines and the ith line in geometric image errors that have not been compensated begins at a location $x_{ai}$ and ends at location $x_{ei}$ on a projection surface, said arrangement comprising:

a source for the emission of a substantially parallel light bundle for a sequential illumination of image points of the video image, which source can be intensity-modulated;

a deflection device for scanning the light bundle in two dimensions;

a storage for the sequential storage of line information for the intensity modulation of the source for N image points, the values $x_{ad}$ and $x_{ed}$, where $x_{ed} > x_{ad}$, wherein $x_{ad}$ describes the start of the line of the compensated image, wherein $x_{ad} \geq \text{Max}(x_{ai})$ of all lines i, and $x_{ed}$ describes the end of the line of the compensated image wherein $x_{ed} \leq \text{Min}(x_{ei})$; and a control device for modulating the source and for controlling the deflection device in accordance with functions by which the light bundle is deflected and/or intensity-modulated in such a way that all image points of the line i for deflection can be displayed on the protection surface sequentially within the area $[x_{ad}; x_{ed}]$.

9. The arrangement according to claim 8, wherein a fixed time interval T is predetermined for all lines, and the control device is intensity-modulated according to a function by means of which the light bundle is blanked at the beginning of every line start of a line i during a time interval for scanning the length $(x_{ad}-x_{ai})$, whereupon the information determined for intensity modulation for the N image points is read out of the storage within a time interval for scanning length $(x_{ed}-x_{ad})$ and the source is intensity-modulated with this information and, at the conclusion of the sequential illumination of the N image points on the projection surface, the light bundle is blanked for the remainder of the time interval T for the scanning of a line.

10. The arrangement according to claim 9, wherein the number N is greater than the quantity of image points of the video standard of the video image to be displayed.

11. The arrangement according to claim 10, wherein the control device also stores in the storage the information for dark image points which is required before and after the time interval for scanning the length $(x_{ed}-x_{ad})$, and the line information in the storage generated in this way can be supplied in its entirety to the deflection device during time T.

12. The arrangement according to claim 8, wherein the deflection device, with respect to framewise deflection, is controlled diverging from a constant deflection angle change by a function on the basis of which the line spacings of adjacent lines in the total image differ from one another by less than 30%.

13. The arrangement according to claim 8, wherein the deflection device, with respect to framewise deflection, is controlled diverging from a constant deflection angle change by a function on the basis of which the line spacings of adjacent lines in the total image differ from one another by less than 10%.

14. The arrangement according to claim 8, wherein the deflection device, with respect to line deflection, is controlled in divergence from a constant change in deflection angle at which the video information $V_i(x)$ of the line i for the image information at every location x differs with respect to video information $V_{iT}(x)$ of an undistorted image by a maximum amount $$|V_{iT}(x) - V_i(x)| = \left|\frac{\partial Vi}{\partial x}\Delta x_i\right|,$$

where the value $\Delta x_i$ determined by this equation is less than 0.3-times the line length, especially less than 0.1-times the line length, divided by the number of image points according to the video standard.

15. The arrangement according to claim 8, wherein magnification optics are provided.

16. The arrangement according to claim 8, wherein a first component group which comprises the deflection device and at least one socket for inserting a light-conducting fiber and within which the light introduced into the socket is guided for deflection into the deflection device, a component group which is separate from the first component group and which has the control device and the source which can be intensity-modulated and at least one socket for insertion of a light-conducting fiber and within which the light of the source, which can be intensity-modulated, is conducted into this socket, at least one light-conducting fiber for coupling the first component group with the second component group via the respective sockets and a fastening device for the first component group by which the first component group can be arranged at an angle to the projection surface, wherein the compensation is configured for correcting the distortion given by imaging at this angle.

17. The arrangement according to claim 16, fastening means for fastening the first component group to a wall, ceiling or floor of a room, and fastening means for fastening a screen serving as projection surface to the wall of the room.

18. The arrangement according to claim 16, wherein the first component group and the second component group are combined in a housing and this housing has fastening means for fastening to a wall, ceiling or floor of a room.

19. The arrangement according to claim 16, wherein a projection surface at whose edge, especially its upper edge, there is provided a holding device by which the first component group is fastened so as to be off-center with respect to the projection surface, so that the video image is displayed at the above-mentioned angle.

20. An arrangement for displaying video images on a projection surface in which the display is carried out on the projection surface at an inclination, comprising:
- a source for the emission of a substantially parallel light bundle for a sequential illumination of image points of the video image, which source can be intensity-modulated;
- a deflection device for scanning the light bundle in two dimensions; and
- a control device which controls the intensity modulation for the light bundle as well as the deflection of the light bundle in accordance with a function that is obtained through a calculated distortion correction of the image, at least with respect to the inclination.

* * * * *